US012565579B2

(12) United States Patent
Bellehumeur et al.

(10) Patent No.: US 12,565,579 B2
(45) Date of Patent: Mar. 3, 2026

(54) LINEAR HIGH-DENSITY POLYETHYLENE WITH HIGH TOUGHNESS AND HIGH ESCR

(71) Applicant: NOVA Chemicals (International) S.A., Fribourg (CH)

(72) Inventors: Celine Bellehumeur, Calgary (CA); Brian Molloy, Airdrie (CA)

(73) Assignee: NOVA Chemicals (International) S.A., Fribourg (CH)

( * ) Notice: Subject to any disclaimer, the term of this patent is extended or adjusted under 35 U.S.C. 154(b) by 970 days.

(21) Appl. No.: 17/774,673

(22) PCT Filed: Oct. 27, 2020

(86) PCT No.: PCT/IB2020/060056
§ 371 (c)(1),
(2) Date: May 5, 2022

(87) PCT Pub. No.: WO2021/084416
PCT Pub. Date: May 6, 2021

(65) Prior Publication Data
US 2022/0396690 A1      Dec. 15, 2022

Related U.S. Application Data

(60) Provisional application No. 62/929,304, filed on Nov. 1, 2019.

(51) Int. Cl.
*C08L 23/08*      (2025.01)
*C08L 23/0807*      (2025.01)

(52) U.S. Cl.
CPC ................................ *C08L 23/0815* (2013.01)

(58) Field of Classification Search
CPC ........... C08L 23/0815; C08L 2205/025; B29K 2023/06; C08F 4/65908; C08F 4/65912; C08F 2420/04; C08F 210/16; C08F 2/001; C08F 210/14; C08F 2500/03; C08F 2500/12; C08F 2500/07; C08F 2500/27; C08F 2500/28; C08F 2500/06; C08F 2500/37; C08F 2500/13; C08F 2500/31; B29C 41/04
See application file for complete search history.

(56) References Cited

U.S. PATENT DOCUMENTS

| | | | |
|---|---|---|---|
| 4,105,609 A | 8/1978 | Machon et al. |
| 4,379,882 A | 4/1983 | Miyata |
| 4,731,438 A | 3/1988 | Bernier |
| 4,803,259 A | 2/1989 | Zboril et al. |
| 5,206,075 A | 4/1993 | Hodgson, Jr. |
| 5,292,845 A | 3/1994 | Kawasaki et al. |
| 5,376,439 A | 12/1994 | Hodgson et al. |
| 6,180,730 B1 | 1/2001 | Sibtain et al. |
| 6,372,864 B1 | 4/2002 | Brown |
| 7,153,909 B2 | 12/2006 | Van Dun et al. |

| | | | |
|---|---|---|---|
| 7,307,126 B2 | 12/2007 | Lustiger et al. |
| 7,396,881 B2 | 7/2008 | Lustiger et al. |
| 7,803,629 B2 | 9/2010 | DesLauriers et al. |
| 8,022,143 B2 | 9/2011 | Wang et al. |
| 8,076,421 B2 | 12/2011 | Kapur et al. |
| 8,101,687 B2 | 1/2012 | Schramm et al. |
| 8,101,693 B2 | 1/2012 | Van Asseldonk et al. |
| 8,492,498 B2 | 7/2013 | Buck et al. |
| 8,791,205 B2 | 7/2014 | Michie, Jr. et al. |
| 8,829,115 B2 | 9/2014 | Hermel-Davidock et al. |
| 9,056,970 B2 | 6/2015 | Davis et al. |
| 9,102,819 B2 | 8/2015 | Kapur et al. |
| 9,512,282 B2 | 12/2016 | Li et al. |
| 9,512,283 B2 | 12/2016 | Wang et al. |
| 9,695,309 B2 | 7/2017 | Bellehumeur et al. |

(Continued)

FOREIGN PATENT DOCUMENTS

| | | |
|---|---|---|
| CA | 2 868 640 A1 | 4/2016 |
| EP | 1 146 077 A1 | 10/2001 |

(Continued)

OTHER PUBLICATIONS

Tung, L. H. and Buckser, S.; The Effect of Molecular Weight on the Crystallinity of Polyethylene; J. Phys. Chem., (1958); vol. 62; pp. 1530-1534.
Randall, James C.; A Review of High Resolution Liquid Carbon Nuclear Magnetic Resonance Characterizations of Ethylene-Based Polymers; JMA-Rev. Macromol. Chem. Phys., C29(2 & 3) (1989); p. 285.
Nobile, Maria Rossella and Cocchini, Franco; Evaluation of molecular weight distribution from dynamic moduli; Rheol Acta (2001) 40; pp. 111-119.
Deslauriers, Paul J. and Rohlfing, David C.; Estimating Slow Crack Growth Performance of Polyethylene Resins from Primary Structures such as Molecular Weight and Short Chain Branching; Macromol. Symp. (2009) 282; pp. 136-149.

(Continued)

*Primary Examiner* — K. Boyle
(74) *Attorney, Agent, or Firm* — Thomas J. Styslinger, Reg. No. 75185

(57) ABSTRACT

An interpolymer product comprising: a first ethylene interpolymer comprising ethylene and an $\alpha$-olefin having a weight-average molecular weight ($M_w$) of greater than 250,000 and a density of less than 0.930 g/cm$^3$, and a second ethylene interpolymer comprising ethylene and an $\alpha$-olefin wherein the second ethylene interpolymer comprises a $M_w$ of less than 70,000 and a density of greater than 0.930 g/cm$^3$; and wherein the interpolymer product comprises an environmental stress crack resistance (ESCR), measured according to ASTM D1693, Condition B, 10% IGEPAL CO-630, of greater than 90 hours. The interpolymer product may be manufactured in a continuous solution polymerization process utilizing at least two reactors employing at least one single site catalyst formulation and at least one heterogeneous catalyst formulation.

35 Claims, 6 Drawing Sheets

(56)  References Cited

U.S. PATENT DOCUMENTS

| | | | |
|---|---|---|---|
| 9,758,653 | B2 | 9/2017 | Wang et al. |
| 2005/0256266 | A1* | 11/2005 | Lustiger .............. C08L 23/0815 |
| | | | 525/191 |
| 2006/0247373 | A1 | 11/2006 | Goyal et al. |
| 2007/0298508 | A1 | 12/2007 | DesLauriers et al. |
| 2017/0158789 | A1* | 6/2017 | Bellehumeur ........ C08F 110/14 |
| 2017/0267822 | A1* | 9/2017 | Bellehumeur .......... B32B 27/08 |
| 2018/0230298 | A1 | 8/2018 | Wang et al. |
| 2019/0168936 | A1* | 6/2019 | Wang ................... B65D 47/122 |

FOREIGN PATENT DOCUMENTS

| | | | |
|---|---|---|---|
| WO | 93/03093 | A1 | 2/1993 |
| WO | 2005/121239 | A2 | 12/2005 |
| WO | 2007/024746 | A1 | 3/2007 |

OTHER PUBLICATIONS

Dealy, John and Plazek, Don; Time-Temperature Superposition—A Users Guide; Rheology Bulletin, 78(2), Jul. 2009, pp. 16-31.
Trinkle, Stefan; Walter, Philipp and Friedrich, Christian; Van Gurp-Palmen Plot II—classification of long chain branched polymers by their topology; Rheol Acta (2002) 41; pp. 103-113.
Thompson, Duncan E.; Mcauley, Kim B. and Mclellan, P. James; A Simplified Model for Prediction of Molecular Weight Distributions in Ethylene-Hexene Copolymerization Using Ziegler-Natta Catalysts; Macromol. React. Eng. (2007) 1, pp. 523-536.
Thompson, Duncan E.; Mcauley, Kim B. and Mclellan, P. James; Exploring Reaction Kinetics of a Multi-Site Ziegler-Natta Catalyst Using Deconvolution of Molecular Weight Distributions for Ethylene-Hexene Copolymers; Macromol. React. Eng. (2007) 1, pp. 264-274.
Van Gurp, Marnix and Palmen, Jo; Time-Temperature Superposition for Polymeric Blends; J. Palmen. Rheol. Bulletin (1998), 67(1); pp. 5-8.
Wu, Souheng; Chain Structure and Entanglement; Journal of Polymer Science: Part B: Polymer Physics, vol. 27; (1989) pp. 723-741.
Wild, L.; Ryle, T. R.; Knobelock, D. C. and Peat, L. R.; Determination of Branching Distributions in Polyethylene and Ethylene Copolymers; Journal of Polymer Science: Polymer Physics Edition, vol. 20 (1982); pp. 441-455.
Rudin, Alfred; The Elements of Polymer Science and Engineering; 2nd Edition Academic Press (1999); Chapter 2: Basic Principles of Polymer Molecular Weights; pp. 41-71.
Rudin, Alfred; The Elements of Polymer Science and Engineering: 2nd Edition Academic Press (1999); Chapter 3: Practical Aspects of M<olecular Weight Measurements; pp. 73-120.

ASTM D3124-98 (Reapproved 2011)—Standard Test Method for Vinylidene Unsaturation in Polyethylene by Infrared Spectrophotometry; Current edition approved Feb. 1, 2011. Publiched Mar. 2011. Originally approved in 1972. Last previous edition approved in 2003 as D3124-98(2003); pp. 1-4.
ASTM D6248-98 (Reapproved 2012)—Standard Test Method for Vinyl and Trans Unsaturation in Polyethylene by Infrared Spectrophotometry; Current edition approved May 1, 2012. Published Jul. 2012. Originally approved in 1998. Last previous edition approved in 2004 as D6248-98 (2004); pp. 1-3.
ASTM D6645-01 (Reapproved 2010)—Standard Test Method for Methyl (Comonomer) Content in Polyethylene by Infrared Spectrophotometry; Current edition approved Jan. 1, 2010. Published Jan. 2010. Originally approved in 2001. Last previous edition approved in 2001 as D6645-01. pp. 1-4.
ASTM D256-10—Standard Test Methods for Determining the Izod Pendulum Impact Resistance of Plastics; Current edition approved May 1, 2010. Published Jun. 2010. Originally approved in 1926. Last previous edition approved in 2006 as D256-06a. pp. 1-20.
ASTM D790-10; Standard Text Methods for Flexural Properties of Unreinforced and Reinforced Plastics and Electrical Insulating Materials; Current edition approved Apr. 1, 2010. Published Apr. 2010. Originally approved in 1970. Last previous edition approved in 2007 as D790-07. pp. 1-11.
ASTM D3418-12; Standard Test Method for Transition Temperatures and Enthalpies of Fusion and Crystallization of Polymers by Differential Scanning Calorimetry: Current edition approved Aug. 1, 2012. Published Sep. 2012. Originally approved in 1975. Last previous edition approved in 2008 as D3418-08. pp. 1-7.
ASTM D792-13; Standard Test Methods for Density and Specific Gravity (Relative Density) of Plastics by Displacement; Current edition approved Nov. 1, 2013. Published Nov. 2013. Originally approved in 1944. Last previous edition approved in 2008 as D792-08. pp. 1-6.
ASTM D1238-13; Standard Test Method for Melt Flow Rates of Thermoplastics by Extrusion Plastometer; Current edition approved Aug. 1, 2013. Published Aug. 2013. Originally approved in 1965. Last previous edition approved in 2010 as D1238-10. pp. 1-16.
ASTM D638-14; Standard Test Method for Tensile Properties of Plastics; Current edition approved Dec. 15, 2014. Published Mar. 2015. Originally approved in 1941. Last previous edition approved in 2010 as D638-10. pp. 1-17.
ASTM D1693-15; Standard Test Method for Environmental Stress-Cracking of Ethylene Plastics; Current edition approved May 1, 2015. Originally approved in 1959. Last previous edition approved in 2013 as D1693-13. pp. 1-11.

* cited by examiner

LINEAR HIGH-DENSITY POLYETHYLENE WITH HIGH TOUGHNESS AND HIGH ESCR

TECHNICAL FIELD

This disclosure generally relates to an interpolymer product manufactured in a continuous solution polymerization process utilizing at least two reactors employing at least one single site catalyst formulation and at least one heterogeneous catalyst formulation as well as methods of making and using the same.

BACKGROUND ART

Rotomolding or rotational molding may include adding an amount of material to a mold in a rotational molding machine, heating and rotating the mold such that the material coats the walls of the mold, cooling the mold to produce a rotomolded article, and releasing the rotomolded article from the mold. Examples of rotomolding machines may include rock and roll machines, clamshell machines, vertical or up and over rotational machines, shuttle machines, swing arm machines, and carousel machines. Rotational molding machines may include a wide range of sizes. Examples of rotomolded articles include, but are not limited to, toys, bins, containers, helmets, boats, and large tanks.

Ethylene interpolymers products are widely used in rotomolding applications to produce rotomolded articles. There is a need to improve the Environmental Stress Crack Resistance (ESCR) of rotomolding articles while maintaining or increasing the stiffness and impact properties, e.g., ARM Impact at low temperature ($-40°$ C.). A person having ordinary skill in the art would appreciate that the stiffness of conventional ethylene interpolymers may be increased by increasing the density of the ethylene interpolymer, and that the ESCR typically decreases as density increases.

Accordingly, it may be desirable to provide rotomolded articles having improved ESCR while maintaining or increasing the stiffness and/or impact properties.

SUMMARY OF INVENTION

This disclosure generally describes rotomolded articles having improved ESCR while maintaining or increasing the stiffness and/or impact properties.

An interpolymer product including: a first ethylene interpolymer including ethylene and an $\alpha$-olefin having a weight-average molecular weight (Mw) of greater than 250,000 and a density of less than 0.930 g/cm3, and a second ethylene interpolymer including ethylene and an $\alpha$-olefin wherein the second ethylene interpolymer includes a Mw of less than 70,000 and a density of greater than 0.930 g/cm3; and wherein the interpolymer product includes an environmental stress crack resistance (ESCR), measured according to ASTM D1693, Condition B, 10% IGEPAL® CO-630, of greater than 90 hours. The interpolymer product may be manufactured in a continuous solution polymerization process utilizing at least two reactors employing at least one single site catalyst formulation and at least one heterogeneous catalyst formulation.

BRIEF DESCRIPTION OF THE DRAWINGS

The rotomolded articles described herein may be better understood by considering the following description in conjunction with the accompanying drawings; it being understood that this disclosure is not limited to the accompanying drawings.

DESCRIPTION OF EMBODIMENTS

Figure 1:
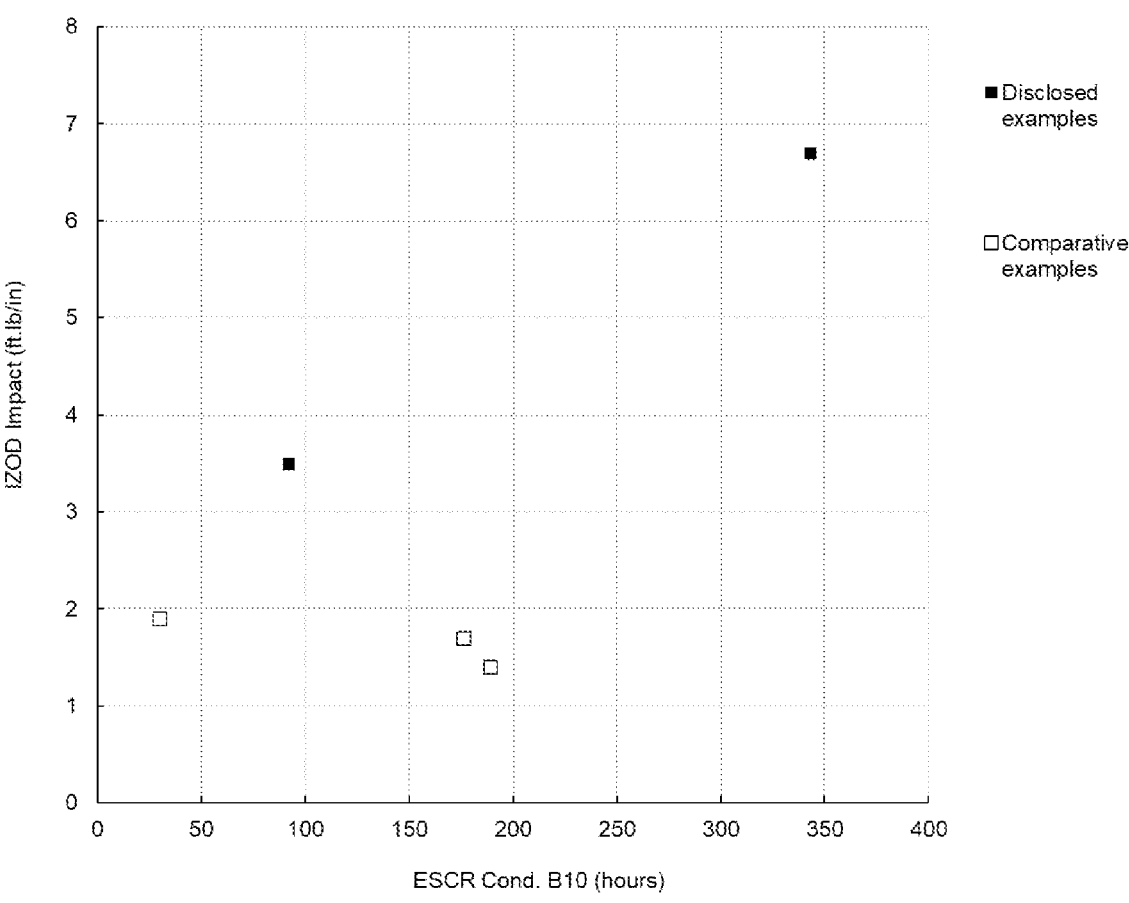
FIG. 1 illustrates the IZOD impact strength (ft.lb/inch) versus the Environmental Stress Crack Resistance (ESCR) (hr) of ethylene interpolymer polymers according to the present disclosure and comparative examples.

This disclosure describes features, aspects, and advantages of rotomolded articles including at least one ethylene interpolymer product manufactured in a continuous solution polymerization process utilizing at least two reactors employing at least one single site catalyst formulation and at least one heterogeneous catalyst formulation. It is understood, however, that this disclosure also embraces numerous alternative features, aspects, and advantages that may be accomplished by combining any of the various features, aspects, and/or advantages described herein in any combination or sub-combination that one of ordinary skill in the art may find useful. Such combinations or sub-combinations are intended to be included within the scope of this disclosure. As such, the claims may be amended to recite any features, aspects, and advantages expressly or inherently described in, or otherwise expressly or inherently supported by, this disclosure. Further, any features, aspects, and advantages that may be present in the prior art may be affirmatively disclaimed. Accordingly, this disclosure may comprise, consist of, consist essentially of or be characterized by one or more of the features, aspects, and advantages described herein.

All numerical quantities stated herein are approximate, unless stated otherwise. Accordingly, the term "about" may be inferred when not expressly stated. The numerical quantities disclosed herein are to be understood as not being strictly limited to the exact numerical values recited. Instead, unless stated otherwise, each numerical value stated herein is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding techniques. Notwithstanding the approximations of numerical quantities stated herein, the numerical quantities described in specific examples of actual measured values are reported as precisely as possible. Any numerical values, however, inherently contain certain errors necessarily resulting from the standard deviation found in their respective testing measurements.

All numerical ranges stated herein include all sub-ranges subsumed therein. For example, a range of "1 to 10" or "1-10" is intended to include all sub-ranges between and including the recited minimum value of 1 and the recited maximum value of 10 because the disclosed numerical ranges are continuous and include every value between the minimum and maximum values. Any maximum numerical limitation recited herein is intended to include all lower numerical limitations. Any minimum numerical limitation recited herein is intended to include all higher numerical limitations.

All compositional ranges stated herein are limited in total to and do not exceed 100 percent (e.g., volume percent or weight percent) in practice. When multiple components may be present in a composition, the sum of the maximum amounts of each component may exceed 100 percent, with the understanding that, and as those skilled in the art would readily understand, that the amounts of the components may be selected to achieve the maximum of 100 percent.

In the following description, certain details are set forth in order to provide a better understanding of various features, aspects, and advantages of the disclosure. However, one skilled in the art will understand that these features, aspects, and advantages may be practiced without these details. In other instances, well-known structures, methods, and/or techniques associated with methods of practicing the various features, aspects, and advantages may not be shown or described in detail to avoid unnecessarily obscuring descriptions of other details of the description.

Definitions

As generally used herein, the articles "the", "a", and "an" refer to one or more of what is claimed or described.

As generally used herein, the terms "include", "includes", and "including" are meant to be non-limiting.

As generally used herein, the terms "have", "has", and "having" are meant to be non-limiting.

As generally used herein, the term "characterized by" is meant to be non-limiting.

As generally used herein, the term "monomer" refers to a small molecule that may chemically react and become chemically bonded with itself or other monomers to form a polymer.

As generally used herein, the term "comonomer(s)" refers to the one or more additional monomers and often include α-olefins.

As generally used herein, the term "α-olefin" refers to a monomer having a linear hydrocarbon chain containing from 3-20 carbon atoms having a double bond at one end of the chain.

As generally used herein, the term "homopolymer" refers to a polymer that includes only one type of monomer.

As generally used herein, the term "ethylene polymer" refers to macromolecules produced from ethylene monomers and, optionally, one or more additional monomers, and regardless of the specific catalyst or specific process used to make the ethylene polymer. Common ethylene polymers include high density polyethylene (HDPE), medium density polyethylene (MDPE), linear low density polyethylene (LL-DPE), very low density polyethylene (VLDPE), ultralow density polyethylene (ULDPE), plastomer and elastomers. Ethylene polymers include polymers produced in high pressure polymerization processes, such as low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). Ethylene polymers also include block copolymers that include 2-4 comonomers. Ethylene polymers includes combinations of, or blends of, the ethylene polymers described herein.

As generally used herein, the term "ethylene interpolymer" refers to a subset of ethylene polymers that excludes ethylene polymers produced in high pressure polymerization processes, such as LDPE and EVA, for example.

As generally used herein, the term "heterogeneous ethylene interpolymers" refers to a subset of ethylene interpolymers produced using a heterogeneous catalyst formulation, such as Ziegler-Natta catalysts and chromium catalysts, for example.

As generally used herein, the term "heterogeneous ethylene interpolymers" refers to a subset of ethylene interpolymers that are produced using a heterogeneous catalyst formulation, such as Ziegler-Natta or chromium catalysts, for example. In general, heterogenous ethylene interpolymers may have molecular weight distributions greater than the molecular weight distributions of homogeneous ethylene interpolymers.

As generally used herein, the term "homogeneous ethylene interpolymer" refers to a subset of ethylene interpolymers that are produced using metallocene or single site catalyst formulations. In general, homogeneous ethylene interpolymers may have narrow molecular weight distributions, for example gel permeation chromatography (GPC) $M_w/M_n$ values of less than 2.8, and narrow comonomer distributions, i.e., each macromolecule within the molecular weight distribution has a similar comonomer content.

It is well known to those skilled in the art that homogeneous ethylene interpolymers may be subdivided into "linear homogeneous ethylene interpolymers" and "substantially linear homogeneous ethylene interpolymers". These two subgroups generally differ in the amount of long chain branching, and more specifically, linear homogeneous ethylene interpolymers have less than 0.01 long chain branches per 1000 carbon atoms; while substantially linear ethylene interpolymers have greater than 0.01-3.0 long chain branches per 1000 carbon atoms. A long chain branch is macromolecular in nature, i.e., similar in length to the macromolecule that the long chain branch is attached to. As generally used herein, the term "homogeneous ethylene interpolymer" refers to both linear homogeneous ethylene interpolymers and substantially linear homogeneous ethylene interpolymers.

As generally used herein, the term "polyolefin" includes ethylene polymers and propylene polymers. Examples of propylene polymers include isotactic, syndiotactic and atactic propylene homopolymers, random propylene copolymers containing at least one comonomer and impact polypropylene copolymers or heterophasic polypropylene copolymers.

As generally used herein, the term "thermoplastic" refers to a polymer that becomes liquid when heated, flows under pressure, and solidifies when cooled. Examples of thermoplastic polymers include ethylene polymers as well as other polymers commonly used in the plastic industry, such as barrier resins (EVOH), tie resins, polyethylene terephthalate (PET), and polyamides, for example.

As generally used herein the term "monolayer" refers a rotomolded article where the wall structure includes a single layer.

As generally used herein, the terms "hydrocarbyl", "hydrocarbyl radical", and "hydrocarbyl group" refer to linear or cyclic, aliphatic, olefinic, acetylenic and aryl (aromatic) radicals including hydrogen and carbon that are deficient by one hydrogen.

As generally used herein, the term "alkyl radical" refers to linear, branched and cyclic paraffin radicals that are deficient by one hydrogen radical, such as methyl ($-CH_3$) and ethyl ($-CH_2CH_3$) radicals, for example. The term "alkenyl radical" refers to linear, branched and cyclic hydrocarbons having at least one carbon-carbon double bond that is deficient by one hydrogen radical.

As generally used herein, the term "R1" and its superscript form "$^{R1}$" refers to a first reactor in a continuous solution polymerization process; it being understood that R1 is distinctly different from the symbol $R^1$, which may be used in chemical formula to represent a hydrocarbyl group. Similarly, the term "R2" and it's superscript form "$^{R2}$" refers to a second reactor, the term "R3" and its superscript form "$^{R3}$" refers to a third reactor.

Catalysts

Organometallic catalyst formulations that are efficient in polymerizing olefins are well known in the art. In general, at least two catalyst formulations may be employed in a continuous solution polymerization process. The first catalyst formulation is a single site catalyst formulation that produces a first ethylene interpolymer. The second catalyst formulation is a heterogeneous catalyst formulation that produces a second ethylene interpolymer. Optionally, a third ethylene interpolymer is produced using the heterogeneous catalyst formulation that was used to produce the second ethylene interpolymer, or a different heterogeneous catalyst formulation may be used to produce the third ethylene interpolymer. In the continuous solution process, the catalyst formulations may be solution blended to produce an ethylene interpolymer product.

Single Site Catalyst Formulation

The catalyst components of the single site catalyst formulation may include a wide variety of catalyst components. A single site catalyst formulation may include the following three or four components: (i) a bulky ligand-metal complex; (ii) an alumoxane co-catalyst; (iii) an ionic activator; and optionally, (iv) a hindered phenol. As generally used herein: "(i)" refers to the amount of "component (i)", i.e., the bulky ligand-metal complex added to R1; "(ii)" refers to "component (ii)", i.e., the alumoxane co-catalyst; "(iii)" refers to "component (iii)", i.e., the ionic activator; and "(iv)" refers to "component (iv)", i.e., the optional hindered phenol.

Component (i) may be represented by Formula (I):

$$(L^A)_a M(PI)_b (Q)_n$$

wherein ($L^A$) represents a bulky ligand; M represents a metal atom; PI represents a phosphinimine ligand; Q represents a leaving group; a is 0 or 1; b is 1 or 2; (a+b)=2; n is 1 or 2; and the sum of (a+b+n) equals the valance of the metal M.

The bulky ligand $L^A$ in Formula (I) may include unsubstituted or substituted cyclopentadienyl ligands or cyclopentadienyl-type ligands, heteroatom substituted and/or heteroatom containing cyclopentadienyl-type ligands. For example, cyclopentaphen-anthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. The bulky ligand $L^A$ may include any other ligand structure capable of $\eta$-bonding to the metal M, including both $\eta^3$-bonding and $\eta^5$-bonding to the metal M. The bulky ligand $L^A$ may include one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. The bulky ligand $L^A$ may include bulky amides, phosphides, alkoxides, aryloxides, imides, carbolides, borollides, porphyrins, phthalocyanines, corrins and other polyazomacrocycles.

The metal M in Formula (I) may include Group 4 metals, such as titanium, zirconium and hafnium, for example.

The phosphinimine ligand, PI, may be represented by Formula (II):

$$(R^P)_3 P = N—$$

wherein each of the $R^P$ groups is independently selected from: a hydrogen atom; a halogen atom; a $C_{1-20}$ hydrocarbyl radical that is unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula-Si($R^S$)$_3$, wherein each of the $R^S$ groups is independently selected from, a hydrogen atom, a $C_{1-8}$ alkyl or alkoxy radical, a $C_{6-10}$ aryl radical, a $C_{6-10}$ aryloxy radical, or a germanyl radical of formula-Ge($R^G$)$_3$, wherein each of the $R^G$ groups is defined as $R^S$.

The leaving group Q may include any ligand that functions as a leaving group to form a catalyst species capable of polymerizing one or more olefin(s). As generally used herein, the term "leaving group" is equivalent to the term "activatable ligand". The leaving group Q may include a monoanionic labile ligand having a sigma bond to M. Depending on the oxidation state of the metal, the value for n is 1 or 2 such that Formula (I) represents a neutral bulky ligand-metal complex. Examples of Q ligands may include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-20}$ alkoxy radicals, $C_{6-10}$ arly or aryloxy radicals. Examples of Q ligands may include weak bases, such as amines, phosphines, ethers, carboxylates, dienes, hydrocarbyl radicals having from 1-20 carbon atoms, for example. In another example, two Q ligands may form part of a fused ring or ring system.

The first catalyst component (i) of the single site catalyst formulation may include structural, optical or enantiomeric isomers (meso and racemic isomers) and mixtures thereof of the bulky ligand-metal complexes described in Formula (I).

The second catalyst component (ii) of the single site catalyst formulation may include an alumoxane co-catalyst that activates component (i) to a cationic complex. An equivalent term for "alumoxane" is "aluminoxane"; although the exact structure of this co-catalyst is uncertain, skilled artisans generally agree that it may be an oligomeric species that include repeating units represented by Formula (III):

$$(R)_2 AlO—(Al(R)—O)_n—Al(R)_2$$

where each of the R groups may be the same or different and may include linear, branched or cyclic hydrocarbyl radicals containing 1-20 carbon atoms and n is from 0-50. An example of an alumoxane is methyl aluminoxane (or MAO), wherein each R group in Formula (III) is a methyl radical.

The third catalyst component (iii) of the single site catalyst formation may include an ionic activator. In general, ionic activators include a cation and a bulky anion, wherein the latter is substantially non-coordinating. Examples of ionic activators may include four coordinate boron ionic activators having four ligands bonded to the boron atom. Examples of boron ionic activators may be represented by Formula (IV):

$$[R^5]^+[B(R_7)_4]^-$$

where B is a boron atom; $R^5$ includes an aromatic hydrocarbyl, e.g., a triphenyl methyl cation; and each $R^7$ is independently selected from phenyl radicals that may be unsubstituted or substituted with 3-5 substituents selected from fluorine atoms, $C_{1-4}$ alkyl or alkoxy radicals that are unsubstituted or substituted with fluorine atoms; and a silyl radical of represented by the formula-$Si(R^9)_3$, where each $R^9$ is independently selected from hydrogen atoms and $C_{1-4}$ alkyl radicals. Examples of boron ionic activators may be represented by Formula (V):

$$[(R^8)_t ZH]^+[B(R^7)_4]^-$$

where B is a boron atom; H is a hydrogen atom; Z is a nitrogen or phosphorus atom; t is 2 or 3; and $R^8$ is selected from $C_{1-8}$ alkyl radicals, phenyl radicals that are unsubstituted or substituted with up to three $C_{1-4}$ alkyl radicals, or one $R^8$ taken together with the nitrogen atom to form an anilinium radical; and $R^7$ is as defined above in Formula (IV).

In both Formulas (IV) and (V), an example of $R^7$ is a pentafluorophenyl radical. In general, boron ionic activators may be described as salts of tetra(perfluorophenyl) boron, e.g., anilinium, carbonium, oxonium, phosphonium and sulfonium salts of tetra(perfluorophenyl)-boron with anilinium and trityl (or triphenylmethylium). Additional examples of ionic activators may include triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl) boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethyl-anilinium tetra(phenyl)boron, N,N-diethylanilinium tetra (phenyl)boron, N,N-diethylanilinium tetra(phenyl)n-butylboron, N,N-2,4,6-pentamethylanilinium tetra(phenyl) boron, di-(isopropyl)ammonium tetra(pentafluorophenyl) boron, dicyclohexylammonium tetra(phenyl)boron, triphenylphosphonium tetra(phenyl)boron, tri(methylphenyl)phosphonium tetra(phenyl)boron, tri(dimethylphenyl) phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5, 6-tetrafluorophenyl)borate, benzene(diazonium) tetrakis(3, 4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5- tetrafluorophenyl)borate, triphenylmethylium tetrakis(2,3,4, 5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component (iv) of the single site catalyst formation may include a hindered phenol. Examples of hindered phenols may include butylated phenolic antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl)benzene and octadecyl-3-(3',5'-di-tert-butyl-4'-hydroxyphenyl)propionate.

To produce an active single site catalyst formulation, the quantity and mole ratios of each of the three components (i)-(iii) or four components (i)-(iv) may be optimized as described below.

Heterogeneous Catalyst Formulations

A number of heterogeneous catalyst formulations are well known to those skilled in the art, including, Ziegler-Natta catalysts and chromium catalyst formulations, for example.

Ziegler-Natta catalysts may include one or more in-line and batch Ziegler-Natta catalyst formulations. As generally used herein, the term "in-line Ziegler-Natta catalyst formulation" refers to the continuous synthesis of a small quantity of active Ziegler-Natta catalyst and immediately injecting this catalyst into at least one continuously operating reactor, where the catalyst polymerizes ethylene and one or more optional α-olefins to form an ethylene interpolymer. As generally used herein, the terms "batch Ziegler-Natta catalyst formulation" and "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, may be transferred to a catalyst storage tank. As generally used herein, the term "procatalyst" refers to an inactive catalyst formulation (inactive with respect to ethylene polymerization); the procatalyst may be converted into an active catalyst by adding an alkyl aluminum co-catalyst. When desirable, the procatalyst may be pumped from the storage tank to at least one continuously operating reactor, where an active catalyst may be formed to polymerize ethylene and one or more optional α-olefins to form an ethylene interpolymer. The procatalyst may be converted into an active catalyst in the reactor or external to the reactor.

A variety of chemical compounds may be used to synthesize or combined with other chemical compounds to produce an active Ziegler-Natta catalyst formulation. Those skilled in the art will understand that the examples described herein are not limited to the specific chemical compounds described.

An active Ziegler-Natta catalyst formulation may be formed from: a magnesium compound, a chloride compound, a metal compound, an alkyl aluminum co-catalyst and an aluminum alkyl. As generally used herein, the magnesium compound may be referred to as "component (v)" or "(v)"; the chloride compound may be referred to as "component (vi)" or "(vi)"; the metal compound may be referred to as "component (vii)" or "(vii)"; the alkyl aluminum co-catalyst may be referred to as "component (viii)" or "(viii)"; and the aluminum alkyl may be referred to as "component (ix)" or "(ix)". As will be appreciated by those skilled in the art, Ziegler-Natta catalyst formulations may include additional components, such as an electron donor, e.g., amines or ethers.

An active in-line Ziegler-Natta catalyst formulation may be prepared as follows. In the first step, a solution of a magnesium compound (component (v)) may be reacted with a solution of the chloride compound (component (vi)) to form a magnesium chloride support suspended in solution. Examples of magnesium compounds include $Mg(R^1)_2$; wherein the $R^1$ groups may be the same or different, linear, branched or cyclic hydrocarbyl radicals containing 1-10 carbon atoms. Examples of chloride compounds include $R^2Cl$; wherein $R^2$ represents a hydrogen atom, or a linear, branched or cyclic hydrocarbyl radical containing 1-10 carbon atoms. In the first step, the solution of magnesium compound may also contain an aluminum alkyl (component (ix)). Examples of aluminum alkyl include $Al(R^3)_3$, wherein the $R^3$ groups may be the same or different, linear, branched or cyclic hydrocarbyl radicals containing from 1-10 carbon atoms. In the second step, a solution of the metal compound (component (vii)) may be added to the solution of magnesium chloride and the metal compound may be supported on the magnesium chloride. Examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen; and X represents chloride or bromide; n is an integer from 3-6 that satisfies the oxidation state of the metal. Examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step, a solution of an alkyl aluminum co-catalyst (component (viii)) may be added to the metal compound supported on the magnesium chloride. A wide variety of alkyl aluminum co-catalysts are suitable, as expressed by Formula (VI):

$$Al(R^4)_p(OR^5)_q(X)_r,$$

wherein the $R^4$ groups may be the same or different, hydrocarbyl groups having from 1-10 carbon atoms; the $OR^5$ groups may be the same or different, alkoxy or aryloxy groups wherein $R^5$ is a hydrocarbyl group having from 1-10 carbon atoms bonded to oxygen; X is chloride or bromide; and; (p+q+r)=3, with the proviso that p is greater than 0. Examples of alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_{5-12}$ alkanes or mixtures thereof. To produce an active in-line Ziegler-Natta catalyst formulation, the quantity and mole ratios of the five components, (v) through (ix), may be optimized as described below.

Additional embodiments of heterogeneous catalyst formulations include formulations where the "metal compound" may include a chromium compound, such as silyl chromate, chromium oxide and chromocene, for example. The chromium compound may be supported on a metal oxide, such as, e.g., silica or alumina. Heterogeneous catalyst formulations containing chromium may also include co-catalysts, such as trialkylaluminum, alkylaluminoxane and dialkoxyalkylaluminum compounds, for example.

Polymerization Process

The ethylene interpolymer products may be made using conventional blending systems and processes including, but not limited to, physical blending and in-situ blending by polymerization in multi-reactor systems. For example, the first ethylene interpolymer may be mixed with the second ethylene interpolymer by molten mixing of the two pre-formed polymers. In another example, the first ethylene interpolymer, second ethylene interpolymer, and third ethylene interpolymer may be made in sequential polymerization stages. The ethylene interpolymer products may be made using an in-series reactor process and an in-parallel reactor process. Gas phase reactor systems, slurry phase reactor systems and solution phase reactor systems may be used. For example, the ethylene interpolymer product may be made using solution phase reaction systems.

The ethylene interpolymer products disclosed herein may be produced in a continuous solution polymerization process as described in U.S. Pat. No. 8,101,693, issued Jan. 24, 2012 and Canadian Patent Application No. 2,868,640, filed Oct. 21, 2014. A dual reactor solution process that may be used to produce the ethylene interpolymer products is described in U.S. Pat. No. 6,372,864 and U.S. Pat. Appl. Pub. No. 20060247373A1.

The continuous solution polymerization process may include a reactor system including at least two continuously stirred reactors, R1 and R2, and an optional tubular reactor, R3. Feeds (e.g., solvent, ethylene, at least two catalyst formulations, optional hydrogen and optional α-olefin) may be continuously fed to the at least two reactors. A single site catalyst formulation may be injected into R1 and a first heterogeneous catalyst formulation may be injected into R2, and optionally R3. Optionally, a second heterogeneous catalyst formulation may be injected into R3. The single site catalyst formulation includes an ionic activator (component (iii)), a bulky ligand-metal complex (component (i)), an alumoxane co-catalyst (component (ii)) and an optional hindered phenol (component (iv)), respectively.

The residence time in each reactor may depend on the design and the capacity of the reactor system. The reactors may be operated under conditions to achieve a thorough mixing of the reactants. The reactors R1 and R2 may be operated in series or parallel modes of operation. In other words, 100% of the effluent from reactor R1 flows directly into reactor R2 in series mode. In parallel mode, reactors R1 and R2 operate independently and the effluents from each of reactors R1 and R2 may be combined downstream from the reactors R1 and R2.

A heterogeneous catalyst formulation is injected into R2. A first in-line Ziegler-Natta catalyst formulation may be injected into R2. A first in-line Ziegler-Natta catalyst formation may be formed within a first heterogeneous catalyst assembly by optimizing one or more of the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate. Within the first heterogeneous catalyst assembly, the first Hold-Up-Time (HUT-1) between the addition of the chloride compound and the addition of the metal compound (component (vii)) may be controlled. The second Hold-Up-Time (HUT-2) between the addition of component (vii) and the addition of the alkyl aluminum co-catalyst, component (viii) may be also controlled. In addition, the third Hold- Up-Time (HUT-3) between the addition of the alkyl aluminum co-catalyst and the injection of the in-line Ziegler-Natta catalyst formulation into R2 may be controlled. Optionally, 100% of the alkyl aluminum co-catalyst, may be injected directly into R2. Optionally, a portion of the alkyl aluminum co-catalyst may be injected into the first heterogeneous catalyst assembly and the remaining portion injected directly into R2. The quantity of in-line heterogeneous catalyst formulation added to R2 may be expressed as the parts-per-million (ppm) of metal compound (component (vii)) in the reactor solution ("R2 (vii) (ppm)"). Injection of the in-line heterogeneous catalyst formulation into R2 may produce a second ethylene interpolymer in a second exit stream (exiting R2). Optionally, the second exit stream may be deactivated by adding a catalyst deactivator. When the second exit stream is not deactivated, the second exit stream enters reactor R3, which may include a tubular reactor. Optionally, one or more of the following fresh feeds may be injected into R3: solvent, ethylene, hydrogen, $\alpha$-olefin and a first or second heterogeneous catalyst formulation; the latter may be supplied from a second heterogeneous catalyst assembly. The chemical composition of the first and second heterogeneous catalyst formulations may be the same, or different, i.e., the catalyst components ((v) through (ix)), mole ratios and hold-up-times may differ in the first and second heterogeneous catalyst assemblies. The second heterogeneous catalyst assembly may generate an efficient catalyst by optimizing hold-up-times and the mole ratios of the catalyst components.

An additional ethylene interpolymer may or may not be produced in tubular reactor R3. A third ethylene interpolymer may not by produced when a catalyst deactivator is added upstream of the tubular reactor R3. A third ethylene interpolymer may be produced when a catalyst deactivator is added downstream from the tubular reactor R3. The optional third ethylene interpolymer may be produced using a variety of operational modes (with the proviso that a catalyst deactivator is not added upstream). Examples of operational modes for the tubular reactor R3 may include: (a) providing residual ethylene, residual optional $\alpha$-olefin, and residual active catalyst to the tubular reactor R3 to produce the third ethylene interpolymer; (b) providing fresh process solvent, fresh ethylene, and optionally fresh $\alpha$-olefin to the tubular reactor R3 and providing the residual active catalyst to the tubular reactor R3 to produce the third ethylene interpolymer; (c) providing a second in-line heterogeneous catalyst formulation to the tubular reactor R3 to polymerize residual ethylene and residual optional $\alpha$-olefin to produce the third ethylene interpolymer; or (d) providing fresh process solvent, fresh ethylene, optionally fresh $\alpha$-olefin and a second in-line heterogeneous catalyst formulation to R3 to produce an additional ethylene interpolymer.

In series mode, R3 produces a third exit stream (the stream exiting R3) containing the first ethylene interpolymer, the second ethylene interpolymer and optionally a third ethylene interpolymer. A catalyst deactivator may be added to the third exit stream producing a deactivated solution; with the proviso a catalyst deactivator is not added if a catalyst deactivator was added upstream of R3.

The deactivated solution may pass through a pressure let down device and/or a heat exchanger, and/or contact a passivator to produce a passivated solution. The passivated solution may pass through a series of vapor liquid separators. The ethylene interpolymer may be recovered by one or more polymer recovery operations, such as vapor-liquid separators, a gear pump, a single screw extruder, and a twin screw extruder, to force the molten ethylene interpolymer product through a pelletizer.

The ethylene interpolymer products may be made using conventional equipment and methods, such as by dry blending the individual components and subsequently melt mixing in a mixer, or by mixing the components together directly in a mixer, such as, for example, a single or twin-screw extruder, which may include a compounding extruder.

The ethylene interpolymer product may include one or more additional polymer components in addition to the first, second and/or third ethylene interpolymers. The additional polymer components may include polymers made in situ and/or polymers added during the extrusion step or compounding step.

Optionally, the ethylene interpolymer product may include at least one additive. The additive may be added during an extrusion step or compounding step, for example. The additives may also be added to the polymer solution either before the vapor-liquid separators, or at some stage throughout the vapor-liquid separation vessels The additive may be added as is or as part of a separate polymer component (i.e., not part of the first, second or third ethylene interpolymers) added during an extrusion or compounding step. Suitable additives are known in the art and may include, but are not limited to, antioxidants, phosphites and phosphonites, nitrones, antacids, UV light stabilizers, UV absorbers, metal deactivators, dyes, fillers and reinforcing agents, nano-scale organic or inorganic materials, antistatic agents, release agents such as zinc stearates, and nucleating agents (including nucleators, pigments or any other chemicals which may provide a nucleating effect to the polyethylene composition). The additives may include up to 20 weight percent (wt %) of the ethylene interpolymer product.

The manufactured articles described herein may also be formed from ethylene interpolymer products synthesized using a batch Ziegler-Natta catalyst. Typically, a first batch Ziegler-Natta procatalyst is injected into R2 and the procatalyst is activated within R2 by injecting an alkyl aluminum co-catalyst forming a first batch Ziegler-Natta catalyst. Optionally, a second batch Ziegler-Natta procatalyst is injected into R3.

Additional Solution Polymerization Process Parameters

A variety of solvents may be used as the process solvent, such as linear, branched or cyclic $C_5$ to $C_{12}$ alkanes, for example. Examples of $\alpha$-olefins may include $C_3$ to $C_{10}$ $\alpha$-olefins. It is well known to skilled artisans that reactor feed streams (e.g., solvent, monomer, $\alpha$-olefin, hydrogen, catalyst formulation) must be essentially free of catalyst deactivating poisons, such as trace amounts of oxygenates such as water, fatty acids, alcohols, ketones and aldehydes, for example. Such poisons may be removed from reactor feed streams using standard purification practices, such as molecular sieve beds, alumina beds and oxygen removal catalysts for the purification of solvents, ethylene and $\alpha$-olefins, for example.

In the continuous polymerization processes, the total amount of ethylene supplied to each reactor system may be portioned or split between one or more of the reactors R1, R2, and R3. This operational variable may be referred to as the Ethylene Split (ES), i.e., "$ES^{R1}$", "$ES^{R2}$" "$ES^{R3}$", refer to the weight percent of ethylene injected in each of reactors R1, R2, and R3, respectively; with the proviso that $ES^{R1} + ES^{R2} + ES^{R3} = 100\%$. The ethylene concentration in each reactor may be also controlled. The reactor R1 ethylene concentration may be defined as the weight of ethylene in reactor R1 divided by the total weight of everything added to reactor R1; the reactor R2 ethylene concentration (wt. %) and reactor R3 ethylene concentration (wt. %) may be defined similarly. The total amount of ethylene converted in each reactor may be monitored. The term "$Q^{R1}$" refers to the percent of the ethylene added to reactor R1 that may be converted into an ethylene interpolymer by the catalyst formulation. Similarly, $Q^{R2}$ and $Q^{R3}$ represent the percent of the ethylene added to each of reactors R2 and R3 that may be converted into ethylene interpolymer, respectively. The term "$Q^T$" represents the total or overall ethylene conversion across the entire continuous solution polymerization plant; i.e., $Q^T=100\times$[weight of ethylene in the interpolymer product]/([weight of ethylene in the interpolymer product]+ [weight of unreacted ethylene]). Optionally, α-olefin may be added to the continuous solution polymerization process. When added, α-olefin may be proportioned or split between each of reactors R1, R2, and R3. This operational variable may be referred to as the Comonomer Split (CS), i.e., "$CS^{R1}$", "$CS^{R2}$", and "$CS^{R3}$" refer to the weight percent of α-olefin comonomer that may be injected in each of reactors R1, R2, and R3, respectively; with the proviso that $CS^{R1}+CS^{R2}+CS^{R3}=100\%$.

In the continuous polymerization processes, polymerization may be terminated by adding a catalyst deactivator. The catalyst deactivator substantially stops the polymerization reaction by changing active catalyst species to inactive forms. Suitable deactivators are well known in the art, and may include: amines (e.g., those described in U.S. Pat. No. 4,803,259); alkali or alkaline earth metal salts of carboxylic acid (e.g., those described in U.S. Pat. No. 4,105,609); water (e.g., those described in U.S. Pat. No. 4,731,438); hydrotalcites, alcohols and carboxylic acids (e.g., those described in U.S. Pat. No. 4,379,882); or a combination thereof (e.g., as described in U.S. Pat. No. 6,180,730).

Prior to entering the vapor/liquid separator, a passivator or acid scavenger may be added to the deactivated solution. Suitable passivators are well known in the art, and may include alkali or alkaline earth metal salts of carboxylic acids or hydrotalcites.

In general, the number of solution reactors may not be particularly important; with the proviso that the continuous solution polymerization process includes at least two reactors that employ at least one single site catalyst formulation.

As noted above, the interpolymer may be produced in a process using at least two continuously stirred reactors in series followed by a tubular reactor. Accordingly, the gel permeation chromatograph (GPC) of the interpolymer may be mathematically deconvoluted into three components.

First Ethylene Interpolymer

The first ethylene interpolymer may be produced with a single site catalyst formulation. When the optional α-olefin is not added to reactor R1, then the ethylene interpolymer produced in reactor R1 is an ethylene homopolymer. When an α-olefin is added to reactor R1, the following weight ratio may be one parameter to control the density of the first ethylene interpolymer: $((\alpha\text{-olefin})/(\text{ethylene}))^{R1}$. The symbol "$\sigma^1$" refers to the density of the first ethylene interpolymer produced in reactor R1. The upper limit on $\sigma^1$ may be 0.93 g/cm$^3$ or 0.923 g/cm$^3$. The lower limit on $\sigma^1$ may be 0.90 g/cm$^3$ or 0.910 g/cm$^3$.

Methods to determine the CDBI$_{50}$ (Composition Distribution Branching Index) of an ethylene interpolymer are well known to those skilled in the art. The CDBI$_{50}$, expressed as a percent, is defined as the percent of the ethylene interpolymer whose comonomer composition is within 50% of the median comonomer composition. It is also well known to those skilled in the art that the CDBI$_{50}$ of ethylene interpolymers produced with single-site catalyst formulations are higher relative to the CDBI$_{50}$ of α-olefin containing ethylene interpolymers produced with heterogeneous catalyst formulations. The upper limit on the CDBI$_{50}$ of the first ethylene interpolymer (produced with a single-site catalyst formulation) may be 98%, 95%, or 90%. The lower limit on the CDBI$_{50}$ of the first ethylene interpolymer may be 70%, 75%, or 80%.

As is well known to skilled artisans, the polydispersity ($M_w/M_n$) of ethylene interpolymers produced with single site catalyst formulations are lower relative to ethylene interpolymers produced with heterogeneous catalyst formulations. The upper limit on the polydispersity ($M_w/M_n$) of the first ethylene interpolymer may be 3 or 2.25. The lower limit on the polydispersity ($M_w/M_n$) of the first ethylene interpolymer may be 1 or 1.75.

The first ethylene interpolymer may include catalyst residues that reflect the chemical composition of the single site catalyst formulation used. Those skilled in the art may understand that catalyst residues may be quantified by the parts per million of metal in the first ethylene interpolymer, where metal refers to the metal in component (i), i.e., the metal in the "bulky ligand-metal complex", which may be referred to "metal A". Examples of metal A may include Group 4 metals, e.g., titanium, zirconium and hafnium. The upper limit on the ppm of metal A in the first ethylene interpolymer may be 1.0 ppm, 0.9 ppm, or 0.8 ppm. The lower limit on the ppm of metal A in the first ethylene interpolymer may be 0.01 ppm, 0.1 ppm, or 0.2 ppm.

The amount of hydrogen added to each of reactor R1 may vary over a wide range allowing the continuous solution process to produce first ethylene interpolymers that differ greatly in melt index, hereafter $I_2^1$ (melt index is measured at 190° C. using a 2.16 kg load following the procedures outlined in ASTM D1238). The quantity of hydrogen added to reactor R1 ($H_2R^1$ (ppm)) may be expressed as the parts-per-million (ppm) of hydrogen in R1 relative to the total mass in reactor R1. The upper limit on the $H_2R^1$ (ppm) may be 100 ppm and the lower limit on the $H_2R^1$ (ppm) may be 0 or greater than zero. Similarly, the upper limit and lower limit on the $H_2R^1$ (ppm) for reactors R2 and/or R3 may be independently the same as or different from the upper limit and lower limit on the $H_2R^1$ (ppm) for reactor R1. Without wishing to be bound to any particular theory, the upper limit on the hydrogen added to each of reactor R1 may depend on the pump capacity, catalyst type, catalyst concentration, comonomer content, and reactor temperature.

The upper limit on the melt index ($I_2^1$) may be 0.01 g/10 min or 0.008 g/10 min. The lower limit on the melt index ($I_2^1$) may be 0.0001 g/10 min or 0.001 g/10 min.

Without wishing to be bound to any particular theory, hydrogen may be used as a transfer agent. The molecular weight may decrease (and the melt index may increase) when the amount of hydrogen fed to the reactor is increased. As discussed above, the amount of hydrogen added to each of reactor R1 for a particular melt index may depend on the catalyst type, catalyst concentration, comonomer content, and reactor temperature.

The upper limit on the weight percent (wt. %) of the first ethylene interpolymer in the ethylene interpolymer product may be 40 wt. %, 30 wt. %, 25 wt. %, or 22 wt. %. The lower limit on the wt. % of the first ethylene interpolymer in the ethylene interpolymer product may be 10 wt. %, 15 wt. %, or 18 wt. %.

Second Ethylene Interpolymer

The second ethylene interpolymer may be produced with a heterogeneous catalyst formulation. When optional α-olefin is not added to reactor R2 either by adding fresh α-olefin to reactor R2 or carried over from reactor R1, then the ethylene interpolymer produced in R2 may include an ethylene homopolymer. When an optional α-olefin is present in reactor R2, the following weight ratio may be one parameter to control the density of the second ethylene interpolymer produced in reactor R2: $((\alpha\text{-olefin})/(\text{ethylene}))$ $R^2$. Hereafter, the symbol "$\sigma^2$" refers to the density of the ethylene interpolymer produced in reactor R2. The upper limit on $\sigma^2$ may be 0.98 $\text{g/cm}^3$ or 0.96 $\text{g/cm}^3$. The lower limit on $\sigma^2$ may be 0.93 $\text{g/cm}^3$ or 0.95 $\text{g/cm}^3$.

When the second ethylene interpolymer contains an α-olefin, the $CDBI_{50}$ of the second ethylene interpolymer is lower relative to the $CDBI_{50}$ of the first ethylene interpolymer that was produced with a single-site catalyst formulation. For example, the upper limit on the $CDBI_{50}$ of the second ethylene interpolymer (that contains an α-olefin) may be 70%, 65%, or 60%. The lower limit on the $CDBI_{50}$ of the second ethylene interpolymer (that contains an α-olefin) may be 45%, 50%, or 55%. When an α-olefin is not added to the continuous solution polymerization process, the second ethylene interpolymer is an ethylene homopolymer. In the case of a homopolymer, which does not contain α-olefin, one can still measure a $CDBI_{50}$ using TREF. It is well known to those skilled in the art that as the α-olefin content in the second ethylene interpolymer approaches zero, there is a smooth transition between the recited $CDBI_{50}$ limits for the second ethylene interpolymers (that contain an α-olefin) and the recited $CDBI_{50}$ limits for the second ethylene interpolymers that are ethylene homopolymers. Typically, the $CDBI_{50}$ of the first ethylene interpolymer is higher than the $CDBI_{50}$ of the second ethylene interpolymer.

The polydispersity $(M_w/M_n)$ of second ethylene interpolymer may be higher than the $M_w/M_n$ of the first ethylene interpolymer. The upper limit on the polydispersity $(M_w/M_n)$ of the second ethylene interpolymer may be 4.0 or 2.9. The lower limit on the polydispersity $(M_w/M_n)$ of the second ethylene interpolymer may be 2.0 or 2.5. In some embodiments, the second interpolymer comprises a polydispersity $(M_w/M_n)$ from 2.0-7.0; or a polydispersity $(M_w/M_n)$ from 2.5-5.0.

The second ethylene interpolymer may include catalyst residues that reflect the chemical composition of the of heterogeneous catalyst formulation used. Those skilled in the art would understand that heterogeneous catalyst residues are typically quantified by the parts per million of metal in the second ethylene interpolymer, where the metal refers to the metal originating from component (vii), i.e., the "metal compound", which may be referred to as "metal B". Examples of metal B include metals selected from Group 4 through Group 8 of the Periodic Table, or mixtures of metals selected from Group 4 through Group 8. Each of the upper limit and lower limit on the ppm of metal B in the second ethylene interpolymer may be described in U.S. Pat. No. 9,512,282. While not wishing to be bound by any particular theory, in series mode of operation it is believed that the chemical environment within the second reactor deactivates the single site catalyst formulation, or in parallel mode of operation the chemical environment within R2 deactivates the single site catalyst formation.

The amount of hydrogen added to reactor R2 may vary over a wide range which allows the continuous solution process to produce second ethylene interpolymers that differ greatly in melt index, hereafter $I_2^2$. The quantity of hydrogen added may be expressed as the parts-per-million (ppm) of hydrogen in reactor R2 relative to the total mass in reactor R2; hereafter $H_2R^2$ (ppm). The upper limit on the $H_2R^2$ (ppm) may be 100 ppm and the lower limit on the $H_2R^2$ (ppm) may be 0 or greater than zero. As discussed above regarding $H_2R^1$, without wishing to be bound to any particular theory, the upper limit on the hydrogen added to each of reactor R2 may depend on the pump capacity, catalyst type, catalyst concentration, comonomer content, and reactor temperature at a particular melt index.

The upper limit on the melt index $(I_2^2)$ may be 25 g/10 min or 22 g/10 min. The lower limit on the melt index $(I_2^2)$ may be 5 g/10 min or 10 g/10 min.

The upper limit on the weight percent (wt. %) of the second ethylene interpolymer in the ethylene interpolymer product may be 90 wt. %, 85 wt. %, or 82 wt. %. The lower limit on the wt. % of the second ethylene interpolymer in the ethylene interpolymer product may be 70 wt. %, 75 wt. %, or 78 wt. %.

Ethylene Interpolymer Product

The upper limit on the density of the ethylene interpolymer product may be 0.97 $\text{g/cm}^3$, 0.965 $\text{g/cm}^3$, or 0.954 $\text{g/cm}^3$. The lower limit on the density of the ethylene interpolymer product suitable for rotomolded articles may be 0.94 $\text{g/cm}^3$, 0.945 $\text{g/cm}^3$, or 0.950 $\text{g/cm}^3$.

The upper limit on the $CDBI_{50}$ of the ethylene interpolymer product may be 90%. The lower limit on the $CDBI_{50}$ of an ethylene interpolymer may be 70%.

The polydispersity $(M_w/M_n)$ of the ethylene interpolymer product may be from 3-6. The upper limit on the $M_w/M_n$ of the ethylene interpolymer product may be from 6, 5, or 4.7. The lower limit on the of the ethylene interpolymer product may be 3, 4, or 4.4.

The catalyst residues in the ethylene interpolymer product reflect the chemical compositions of: the single site catalyst formulation employed in R1 and the heterogeneous catalyst formulation employed in R2. The catalyst residues may be quantified by measuring the parts per million of catalytic metal in the ethylene interpolymer products. In addition, the elemental quantities (ppm) of magnesium, chlorine and aluminum may be quantified. Catalytic metals may originate from two sources, specifically: (a) "metal A" that originates from reactor R2; and (b) "metal B" that originates from reactor R2. As generally used herein, the term "total catalytic metal" means the sum of catalytic metals A+B, and the terms "first total catalytic metal" and "second total catalyst metal" refer to the first ethylene interpolymer product and a comparative "polyethylene composition" that may be produced using different catalyst formulations, respectively.

The upper limit on melt index of the ethylene interpolymer product may be greater than 0.5 g/10 min or from 0.5-8 g/10 min. The lower limit on the melt index of the ethylene interpolymer product may be 0.5 g/10 min or 0.8 g/10 min.

The upper limit on the melt flow ratio $(I_{21}/I_2)$ of the ethylene interpolymer product may be 60 or 70. The lower limit on the melt flow ratio $(I_{21}/I_2)$ of the ethylene interpolymer product may be 30 or 35.

The upper limit on the ESCR of the ethylene interpolymer product may be greater than 90 hours or 500 hours. The lower limit on the ESCR of the ethylene interpolymer product may by 90 hours.

The upper limit on the IZOD of the ethylene interpolymer product may be greater than 2.5 ft.lb/inch or 10 ft.lb/inch.

The lower limit on the IZOD of the ethylene interpolymer product may be 2.5 ft.lb/inch.

EXAMPLES

Test Methods

Prior to testing, each specimen was conditioned for at least 24 hours at 23±2° C. and 50±10% relative humidity. Testing was conducted at 23±2° C. and 50±10% relative humidity. As generally used herein, the term "ASTM conditions" refers to a laboratory that is maintained at 23±2° C. and 50±10% relative humidity. ASTM refers to the American Society for Testing and Materials.

Plaques molded from the polyethylene compositions were tested according to the following ASTM methods: Bent Strip Environmental Stress Crack Resistance (ESCR) at Condition B at 10% IGEPAL at 50° C., ASTM D1693; notched IZOD impact properties, ASTM D 256; Flexural properties, ASTM D 790; Tensile properties, ASTM D 638.

Density

Ethylene interpolymer product densities were determined using ASTM D792-13 (Nov. 1, 2013).

Melt Index

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. As generally used herein, the term "stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively. In this disclosure, melt index was expressed using the units of g/10 min or dg/min; these units are equivalent.

Environmental Stress Crack Resistance (ESCR)

Ethylene interpolymer product ESCR was determined according to ASTM D1693-13 (Nov. 1, 2013). Both ESCR Conditions A and B were employed. In Condition A, the specimen thickness was within the range of 3.00-3.30 mm (0.120-0.130 in) and the notch depth was within the range of 0.50-0.65 mm (0.020-0.025 in). Condition A was conducted using 100% IGEPAL CO-630 (nonylphenoxy polyoxyethylene nonylphenylether). In Condition B, the specimen thickness was within the range of 1.84-1.97 mm (0.0725-0.0775 in) and a notch depth was within the range of 0.30-0.40 mm (0.012-0.015 in). Condition B experiments were conducted using 100% IGEPAL CO-630 or a solution of 10% IGEPAL CO-630 in water.

Gel Permeation Chromatography (GPC)

Ethylene interpolymer product molecular weights, $M_n$, $M_w$, and $M_z$ (g/mol), as well as polydispersity ($M_w/M_n$), were determined by high temperature Gel Permeation Chromatography (GPC) with differential refractive index (DRI) detection using universal calibration (e.g., ASTM—D6474-99). GPC data was determined using a Waters Model 150 Gel Permeation Chromatography (GPC) apparatus equipped with a differential refractive index detector with 1,2,4-trichlorobenzene as the mobile phase at 140° C. The samples were prepared by dissolving the polymer in this solvent and were run without filtration.

Molecular weights are expressed as polyethylene equivalents with a relative standard deviation of 2.9% for the number average molecular weight ("$M_n$") and 5.0% for the weight average molecular weight ("$M_w$"). The molecular weight distribution (MWD) is the weight average molecular weight divided by the number average molecular weight, $M_w/M_n$. The z-average molecular weight distribution is $M_z/M_n$.

Ethylene interpolymer product sample solutions (1-2 mg/mL) were prepared by heating the interpolymer in 1,2,4-trichlorobenzene (TCB) and rotating on a wheel for 4 hours at 150° C. in an oven. The antioxidant 2,6-di-tert-butyl-4-methylphenol (BHT) was added to the mixture to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 microliter. The GPC raw data were processed with CIRRUS GPC software. The GPC columns were calibrated with narrow distribution polystyrene standards. The polystyrene molecular weights were converted to polyethylene molecular weights using the Mark-Houwink equation, as described in the ASTM standard test method D6474.

GPC-FTIR was used to determine the comonomer content as a function of molecular weight. After separation of the polymer by GPC, an on-line FTIR measures the concentration of the polymer and methyl end groups. Methyl end groups are used in the branch frequency calculations. Conventional calibration allows for the calculation of a molecular weight distribution.

Mathematical deconvolutions were performed to determine the relative amount of polymer, molecular weight, and comonomer content of the component made in each reactor Estimates were first obtained from predictions obtained using fundamental kinetic models as described in U.S. Pat. No. 9,695,309 (with kinetic constants specific for each catalyst formulation) as well as feed and reactor conditions. The simulation was based on the configuration of the solution pilot plant described below; which was used to produce the examples of ethylene interpolymer products disclosed herein. The kinetic model predictions were used to establish estimates on the short chain branching distribution among the first and second interpolymer components. The fit between the simulated molecular weight distribution profile against the data obtained from GPC chromatogrpahs was, in some cases that are indicated in Table 2, improved by modeling the molecular weight distribution as a sum of components which have molecular weight distributions described using multiple-site idealized Flory distributions. During the deconvolution, the overall Mn, Mw and Mz are calculated with the following relationships: $Mn=1/\Sigma(w_i/(Mn)_i)$, $Mw=\Sigma(w_i\times(Mw)_i)$, $Mz=\Sigma(w_i\times(Mz)_i^2/\Sigma(w_i\times(Mz)_i)$, where i represents the i-th component and $w_i$ represents the relative weight fraction of the i-th component in the composition.

The following equations were used to calculate the densities and melt index $I_2$:

$$\rho_1 = 0.978863 - 5.94808 \times 10^{-3}\left(\frac{SCB}{1000C}\right)^{0.65} -$$
$$3.83133 \times 10^{-4}[\log_{10}(M_n)]^3 -$$
$$5.77986 \times 10^{-6}\left(\frac{M_w}{M_n}\right)^3 + 5.57395 \times 10^{-3}\left(\frac{M_z}{M_w}\right)^{0.25}$$

Equation (1)

-continued $$\rho_2 = (\rho - w_1\rho_1)/w_2 \qquad \text{Equation (2)}$$

$$\log_{10}(\text{Melt Index } I_2) = \qquad \text{Equation (3)}$$

$$7.900 - 3.909\left[\log_{10}\left(\frac{M_w}{1000}\right)\right] - 0.2799\left(\frac{M_w}{M_n}\right)^{-1}$$

where $M_n$, $M_w$, $M_z$, and SCB/1000C are the deconvoluted values of the individual ethylene polymer components, as obtained from the results of the deconvolution described above, while $\rho$ is the density of the overall ethylene copolymer composition and is determined experimentally. Equations (1) and (2) were used to estimate $\rho_1$ and $\rho_2$, the density of the first and second ethylene copolymer, respectively. Equation (3) was used to estimate the melt index $I_2$. See Duncan E. Thompson, Kim B. McAuley, and P. James McLellan. *Exploring reaction kinetics of a multi-site Ziegler-Natta catalyst using deconvolution of molecular weight distributions for ethylene-hexene copolymers.* Macromolecular Reaction Engineering, 1(2):264-274, 2007. doi: 10.1002/mren.200600028; Duncan E. Thompson, Kim B. McAuley, and P. James McLellan. *A simplified model for prediction of molecular weight distributions in ethylene-hexene copolymerization using Ziegler-Natta catalysts.* Macromolecular Reaction Engineering, 1(5):523-536, 2007. doi:10.1002/mren.200700018; Alfred Rudin, *The elements of polymer science and engineering,* 2nd edition, Academic Press, 1999. See also U.S. Pat. No. 8,022,143.

Unsaturation Content

The quantity of unsaturated groups, i.e., double bonds, in an ethylene interpolymer product was determined according to ASTM D3124-98 (vinylidene unsaturation, published March 2011) and ASTM D6248-98 (vinyl and trans unsaturation, published July 2012). An ethylene interpolymer sample was: a) first subjected to a carbon disulfide extraction to remove additives that may interfere with the analysis; b) the sample (pellet, film or granular form) was pressed into a plaque of uniform thickness (0.5 mm), and; c) the plaque was analyzed by FTIR.

Short Chain Branching Frequency (SCBF)

The short chain branch frequency (SCB per 1000 carbon atoms) of copolymer samples was determined by Fourier Transform Infrared Spectroscopy (FTIR) according to ASTM D6645-01 method. A Thermo-Nicolet 750 Magna-IR Spectrophotometer equipped with OMNIC version 7.2a software was used for the measurements. Comonomer content may be measured using 13C NMR techniques as discussed in Randall, Rev. Macromol. Chem. Phys., C29 (2&3), p 285; U.S. Pat. No. 5,292,845 and International Pub. No. WO 2005/121239.

Differential Scanning Calorimetry (DSC)

The melting behavior including a peak melting point $(T_m)$, the number of peaks, heat of fusion (J/g), and the percent crystallinity of the copolymers may be determined by using a TA Instrument DSC Q1000 Thermal Analyzer at a rate of 10° C./min compliant with ASTM D3418-12. In a DSC measurement, the instrument was calibrated with indium; after calibration, a sample is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The melting point, heat of fusion, and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

Primary Structure Parameter (PSP2)

The PSP2 calculation is described by DesLauriers and Rohlfing in Macromolecular Symposia (2009), 282 (Polyolefin Characterization—ICPC 2008), pages 136-149. The PSP2 calculation may be generally described as a multistep process. The first step involves estimating the homopolymer (or low comonomer polymer) density of a sample from the sample's molecular weight distribution as described by Equation (4): $1/\rho = \Sigma(w_i/\rho_i) = \int 1/\rho$ (dw/dLog M) dLog M Equation (4), where: $\rho = 1.0748 - (0.0241)$Log M. The first step takes into account the effects of molecular weight on sample density. Density values at molecular weights less than 720 g/mol are equal to 1.006 g/cm³ according to this method.

In the second step, to further account for the added contributions to density suppression by the presence of short chain branching for each molecular weight (MW) slice, the difference between the measured bulk density of copolymer and the calculated homopolymer density is divided by the overall short chain branching (SCB) level (as measured by size exclusion chromatography-Fourier transform infrared spectroscopy or by C13-NMR) and subsequently applied to the SCB level in each MW slice. The original observed bulk density of the copolymer (down to 0.852 g/cm³) is obtained through summation of the MW slices as described above. The calculations have been simplified by assuming that all SCB levels will have the same effect on density suppression. However, it is to be understood that the effectiveness of a particular SCB level to suppress density will vary (i.e., the ability of SCB to disrupt crystallinity decreases as the level of SCB increases). Alternately, if the density of the copolymer is not known, then the effects of SCB on sample density can be estimated in the second step by using Equation 2 as described U.S. Pat. Appl. Pub. No. 2007/0298508, now U.S. Pat. No. 7,803,629, where the change in density $\Delta\rho$ refers to the value that is subtracted from the value given in Equation (5) on a molecular slice by slice basis: $\Delta\rho = C_1 (SCB/PDI^n)^{C2} - C_3(SCB/PDI^n)^{C4}$ (Equation 5), where $C_1 = 1.25E-02$, $C_2 = 0.5$, $C_3 = 7.51E-05$, $C_4 = 0.62$ and n=0.32. The third step is to calculate the quantity of $2 l_c + l_a$ where $l_c$ is the estimated crystalline lamella thickness (in nm) and $l_a$ is the estimated thickness (in nm) of the amorphous material at a particular molecular weight given by the following equations (Equations (6) and (7)):

$$T_m(° \text{C.}) = (20587.5149640828)\rho^3 - (63826.2771547794)\rho^2 + \qquad \text{Equation 6}$$
$$(65965.7028912473) - 22585.2457979131$$

$$l_c(\text{nm}) = \frac{0.624 \text{ nm} \cdot T_m^0(K)}{T_m^0(K) - T_m(K)} \qquad \text{Equation 7}$$

In Equation 6, assigned values of 20° C. and 142.5° C. are given for density values of 0.852 g/cm³ and 1.01 g/cm³, respectively. Equation 7 is a form of the well accepted Gibbs Thompson equation. The thickness of the amorphous layer $(l_a)$ is calculated using the Equations (8A) and (8B):

$$w_c = \left(\frac{\rho_c}{\rho}\right)\left(\frac{\rho - \rho_a}{\rho_c - \rho_a}\right) \qquad \text{Equation 8A}$$

-continued $$l_a = \rho_c l_c (1 - w_c)/\rho_a w_c \qquad \text{Equation 8B}$$

where, $w_c$=weight fraction crystallinity, $\rho$=calculated density of MW slice, $\rho_c$=density of 100% crystalline sample (assigned 1.006 g/cm$^3$), and $\rho_a$=density of amorphous phase (0.852 g/cm$^3$).

The fourth step calculates the tie molecule probability (P) for each molecular weight and respective $2(l_c+l_a)$ value according to Equations (9A) and (9B):

$$P = \frac{1}{3} \frac{\int_L^{\infty} r^2 \exp(-b^r r^2) \mathrm{d}r}{\int_0^{\infty} r^2 \exp(-b^2 r^2) \mathrm{d}r} \qquad P = \frac{1}{3} \frac{\frac{\sqrt{\pi}}{4b^3} \int_0^L r^2 \exp(-b^r r^2) \mathrm{d}r}{\frac{\sqrt{\pi}}{4b^3}}$$

$$\text{where } b^2 = \frac{3}{2\bar{r}^2} \text{ and } \bar{r}^2 = (Dnl^2). \quad = \frac{1}{3}\left(1 - \frac{4b^3}{\sqrt{\pi}} \int_0^L r^2 \exp(-b^2 r^2) \mathrm{d}r\right)$$

The symbols above have the following meanings: P=Probability of tie-chain formation, L=Critical distance (nm)=2 $l_c+l_a$, D=Chain extension factor in melt=6.8 for polyethylene, n=Number of links=$M_w/14$ for polyethylene, and l=The link length=0.153 nm for polyethylene. Finally, PSP2 values are calculated from Equations (9A) and (9B) by treating this value essentially as a weighing factor ($P_i$) for each slice of the MWD, where $P_i$ was arbitrarily multiplied× 100 and subsequently defined as PSP2$_i$. As in all of the aforementioned calculations, this value at each slice is multiplied by the respective weight fraction ($w_i$) of the MWD profile to obtain a value for the bulk polymer.

Composition Distribution Branching Index (CDBI)

Frequently, the composition distribution breadth index "CDBI" is used to quantify how the comonomer is distributed within an ethylene interpolymer, as well as to differentiate ethylene interpolymers produced with different catalysts or processes. The "CDBI$_{50}$" is defined as the percent of ethylene interpolymer whose composition is within 50% of the median comonomer composition; this definition is consistent with that described in U.S. Pat. No. 5,206,075. The CDBI$_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the CDBI$_{50}$ of homogeneous ethylene interpolymers are greater than 70%. In contrast, the CDBI$_{50}$ of α-olefin containing heterogeneous ethylene interpolymers are generally lower than the CDBI$_{50}$ of homogeneous ethylene interpolymers.

The composition distribution of a polymer can be characterized by the short chain distribution index (SCDI) or composition distribution breadth index (CDBI). The definition of composition distribution breadth index (CDBI) can be found in International Pub. No. WO 93/03093 and U.S. Pat. No. 5,206,075. The CDBI was determined using a crystal-TREF unit commercially available from Polymer Char (Valencia, Spain). The acronym "TREF" refers to Temperature Rising Elution Fractionation. A sample of ethylene interpolymer product (80-100 mg) was placed in the reactor of the Polymer Char crystal-TREF unit, the reactor was filled with 35 mL of 1,2,4-trichlorobenzene (TCB), heated to 150° C. and held at this temperature for 2 hours to dissolve the sample. An aliquot of the TCB solution (1.5 mL) was then loaded into the Polymer Char TREF column filled with stainless steel beads and the column was equilibrated for 45 minutes at 110° C. The ethylene interpolymer product was then crystallized from the TCB solution, in the TREF column, by slowly cooling the column from 110 to 30° C. using a cooling rate of 0.09° C. per minute. The TREF column was then equilibrated at 30° C. for 30 minutes. The crystallized ethylene interpolymer product was then eluted from the TREF column by passing pure TCB solvent through the column at a flow rate of 0.75 mL/minute as the temperature of the column was slowly increased from 30 to 120° C. using a heating rate of 0.25° C. per minute. Using Polymer Char software a TREF distribution curve was generated as the ethylene interpolymer product was eluted from the TREF column, i.e., a TREF distribution curve is a plot of the quantity (or intensity) of ethylene interpolymer eluting from the column as a function of TREF elution temperature. A CDBI$_{50}$ was calculated from the TREF distribution curve for each ethylene interpolymer product analyzed. The "CDBI$_{50}$" is defined as the percent of ethylene interpolymer whose composition is within 50% of the median comonomer composition (25% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e., the amount of comonomer in the ethylene interpolymer fraction that elutes at a specific temperature. The generation of such calibration curves are described in, e.g., Wild, et al., J. Polym. Sci., Part B, Polym. Phys., Vol. 20 (3), pages 441-455. Generally, Ziegler-Natta catalysts produce ethylene copolymers with a CDBI of less than about 50%, consistent with a heterogeneously branched copolymer. In contrast, metallocenes and other single site catalysts will most often produce ethylene copolymers having a CDBI of greater than about 55%, consistent with a homogeneously branched copolymer.

To determine Composition Distribution Breadth Index, CDBI$_{50}$, a solubility distribution curve is first generated for the polyethylene composition. This is accomplished using data acquired from the Temperature Rising Elution Fractionation (TREF) technique. This solubility distribution curve is a plot of the weight fraction of the copolymer that is solubilized as a function of temperature. This is converted to a cumulative distribution curve of weight fraction versus comonomer content, from which the CDBI$_{50}$ is determined by establishing the weight percentage of a copolymer sample that has a comonomer content within 50% of the median comonomer content on each side of the median. (See International Pub. No. WO 93/03093 and U.S. Pat. No. 5,376,439).

The specific TREF method used herein was as follows. Polymer samples (50-150 mg) were introduced into the reactor vessel of a crystallization-TREF unit (Polymer Char). The reactor vessel was filled with 20-40 mL 1,2,4-trichlorobenzene (TCB), and heated to the desired dissolution temperature (e.g., 150° C.) for 1-3 hours. The solution (0.5-1.5 mL) was then loaded into the TREF column filled with stainless steel beads. After equilibration at a given stabilization temperature (e.g., 110° C.) for 30-45 minutes, the polymer solution was allowed to crystallize with a temperature drop from the stabilization temperature to 30° C. (at the rate of 0.1 or 0.2° C./minute). After equilibrating at 30° C. for 30 minutes, the crystallized sample was eluted with TCB (0.5-0.75 mL/minute) with a temperature ramp from 30° C. to the stabilization temperature (0.25-1.0° C./minute). The TREF column was cleaned at the end of the run for 30 minutes at the dissolution temperature. The data were processed using Polymer Char software, Excel spreadsheet and TREF software developed in-house.

Dynamic Mechanical Analysis (DMA) Rheological Measurements

Dynamic Mechanical Analysis (DMA) rheological measurements (e.g., small-strain (10%) oscillatory shear measurements) were carried out on a Rheometrics Dynamic Spectrometer (RDS-II) or Rheometrics SR5 or ATS Stresstech, on compression molded samples under nitrogen atmosphere at 190° C., using 25 mm diameter cone and plate geometry. The polymer samples were appropriately stabilized with the anti-oxidant additives and then inserted into the test fixture for at least one minute preheating to ensure the normal force decreasing back to zero. DMA experiments are conducted at 10% strain, 0.05 to 100 rad/s and 190° C. Orchestrator Software was used to determine the viscoelastic parameters including the storage modulus (G) and loss modulus (G"). The values of storage modulus G' were estimated at a constant value of loss modulus G" at 500 Pa at 190° C. (G' at $G''_{(500\ Pa)}$). This is to characterize and discriminate the viscoelastic properties of the comparative and disclosed copolymers. This test technique provides an opportunity to study the various characteristics of a polymer melt where the elastic and viscous modulus (G' and G"), viscosity ($\eta^*$), and tan $\delta$ as a function of dynamic oscillation (frequency) are generated to provide information on the rheological behavior in correlation with the molecular architecture.

Dilution Index ($Y_d$) Measurements

A series of small amplitude frequency sweep tests were run on each sample using an Anton Paar MCR501 Rotational Rheometer equipped with the "TruGap™ Parallel Plate measuring system". A gap of 1.5 mm and a strain amplitude of 10% were used throughout the tests. The frequency sweeps were from 0.05 to 100 rad/s at the intervals of seven points per decade. The test temperatures were 170° C., 190° C., 210° C., and 230° C. Master curves at 190° C. were constructed for each sample using the Rheoplus/32 V3.40 software through the Standard TTS (time-temperature superposition) procedure, with both horizontal and vertical shift enabled.

The following defines the Dilution Index ($Y_d$) and Dimensionless Modulus ($X_d$). In addition to having molecular weights, molecular weight distributions and branching structures, blends of ethylene interpolymers may exhibit a hierarchical structure in the melt phase. In other words, the ethylene interpolymer components may be, or may not be, homogeneous down to the molecular level depending on interpolymer miscibility and the physical history of the blend. Such hierarchical physical structure in the melt is expected to have a strong impact on flow and hence on processing and converting; as well as the end-use properties of manufactured articles. The nature of this hierarchical physical structure between interpolymers can be characterized.

The hierarchical physical structure of ethylene interpolymers can be characterized using melt rheology. A convenient method can be based on the small amplitude frequency sweep tests. Such rheology results are expressed as the phase angle $\delta$ as a function of complex modulus $G^*$, referred to as van Gurp-Palmen plots (as described in M. Van Gurp, J. Palmen, Rheol. Bull. (1998) 67(1): 5-8, and; Dealy J, Plazek D. Rheol. Bull. (2009) 78(2): 16-31). For a typical ethylene interpolymer, the phase angle $\delta$ increases toward its upper bound of 90° with $G^*$ becoming sufficiently low. The VGP plots are a signature of resin architecture. The rise of $\delta$ toward 90° is monotonic for an ideally linear, monodisperse interpolymer. The $\delta$ ($G^*$) for a branched interpolymer or a blend containing a branched interpolymer may show an inflection point that reflects the topology of the branched interpolymer (see S. Trinkle, P. Walter, C. Friedrich, Rheo. Acta (2002) 41: 103-113). The deviation of the phase angle $\delta$ from the monotonic rise may indicate a deviation from the ideal linear interpolymer either due to presence of long chain branching if the inflection point is low (e.g., $\delta \le 20°$) or a blend containing at least two interpolymers having dissimilar branching structure if the inflection point is high (e.g., $\delta \ge 70°$).

For commercially available linear low density polyethylenes, inflection points are not observed; with the exception of some commercial polyethylenes that contain a small amount of long chain branching (LCB). To use the VGP plots regardless of presence of LCB, an alternative is to use the point where the frequency $\omega_c$ is two decades below the cross-over frequency $\omega_c$, i.e., $\omega_c = 0.01\omega_X$. The cross-over point is taken as the reference as it is known to be a characteristic point that correlates with MI, density and other specifications of an ethylene interpolymer. The cross-over modulus is related to the plateau modulus for a given molecular weight distribution (see S. Wu. J Polym Sci, Polym Phys Ed (1989) 27:723; M. R. Nobile, F. Cocchini. Rheol Acta (2001) 40:111). The two decade shift in phase angle $\delta$ is to find the comparable points where the individual viscoelastic responses of constituents could be detected. The complex modulus $G^*_c$ for this point is normalized to the cross-over modulus, $G^*_X/(\sqrt{2})$, as $(\sqrt{2})G^*_c/G^*_X$, to minimize the variation due to overall molecular weight, molecular weight distribution and the short chain branching. As a result, the coordinates on VGP plots for this low frequency point at $\omega_c = 0.01\omega_X$, namely $(\sqrt{2})G^*_c/G^*_X$ and $\delta_c$, characterize the contribution due to blending. Similar to the inflection points, the closer the $(\sqrt{2})G^*_c/G^*_X$, $\delta_c$) point is toward the 90° upper bound, the more the blend behaves as if it were an ideal single component.

As an alternative way to avoid interference due to the molecular weight, molecular weight distribution and the short branching of the ethylene $\delta_c$ interpolymer ingredients, the coordinates ($G^*_c$, $\delta_c$) are compared to a reference sample of interest from the following two parameters: "Dilution Index ($Y_d$)" represented by $Y_d = \delta_c - (C_0 - C_1 e^{C_2 ln G^*_c})$, and "Dimensionless Modulus ($X_d$)" represented by $X_d = G^*_{0.01\omega_c}/G^*_r$, in which the constants $C_0$, $C_1$, and $C_2$ are determined by fitting the VGP data $\delta(G^*)$ of the reference sample to the following equation: $\delta = C_0 - C_1 e^{C_2 ln G^*}$, in which $G^*_r$ is the complex modulus of this reference sample at its $\delta_c = \delta(0.01\omega_X)$. When an ethylene interpolymer, synthesized with an in-line Ziegler-Natta catalyst employing one solution reactor, having a density of 0.920 g/cm³ and a melt index (MI or $I_2$) of 1.0 dg/min is taken as a reference sample, the constants are: $C_0 = 93.43°$, $C_1 = 1.316°$, $C_2 = 0.2945$, and $G^*_r = 9432$ Pa. The values of these constants can be different if the rheology test protocol differs from that specified herein.

These regrouped coordinates ($X_d$, $Y_d$) from ($G^*_c$, $\delta_c$) allows comparison between ethylene interpolymer products disclosed herein with Comparative examples. The Dilution Index ($Y_d$) reflects whether the blend behaves like a simple blend of linear ethylene interpolymers (lacking hierarchical structure in the melt) or shows a distinctive response that reflects a hierarchical physical structure within the melt. The lower the $Y_d$, the more the sample shows separate responses from the ethylene interpolymers that include the blend; the higher the $Y_d$, the more the sample behaves like a single component, or single ethylene interpolymer. The Dimensionless Modulus ($X_d$), reflects differences (relative to the reference sample) that are related to the overall molecular weight, molecular weight distribution ($M_w/M_n$) and short chain branching. Without wishing to be bound to any particular theory, it is believed that the Dimensionless Modulus ($X_d$) may be considered to be related to the $M_w/M_n$ and the radius of gyration ($<R_g>^2$) of the ethylene interpolymer in the melt, and increasing $X_d$ may have similar effects as increasing $M_w/M_n$ and/or $<R_g>^2$, without the risk of including lower molecular weight fraction and sacrificing certain related properties.

Tensile Properties

The following tensile properties were determined using ASTM D638: tensile break strength (MPa), elongation at yield (%), yield strength (MPa), ultimate elongation (%), ultimate strength (MPa) and 1 and 2% secant modulus (MPa).

Flexural Properties

Flexural properties, i.e., 2% flexural secant modulus was determined using ASTM D790-10 (published in April 2010).

ARM Impact Testing

The ARM impact test was performed in accordance with ASTM D5628 at a test temperature of −40° C. This test was adapted from the Association of Rotational Molders International, Low Temperature Impact Test, Version 4.0 dated July 2003. The purpose of this test was to determine the impact properties of the rotomolded parts. ARM Impact test specimens, 5 inch×5 inch (12.7 cm×12.7 cm) were cut from a side wall of the cubical rotomolded part that has a thickness of 0.125 inches. Test specimens were thermally equilibrated in a refrigerated testing laboratory maintained at −40±3.5° F. (−40° C.±2° C.) for at least 24 hours prior to impact testing. The testing technique employed is commonly called the Bruceton Staircase Method or the Up-and-Down Method. The procedure establishes the height of a specific dart that will cause 50% of the specimens to fail, i.e., testing (dart falling on specimens) was carried out until there was a minimum of 10 passes and 10 fails. Each failure was characterized as a ductile or a brittle failure. Ductile failure was characterized by penetration of the dart through the specimen and the impact area was elongated and thinned leaving a hole with stringy fibers at the point of failure. Brittle failure was evident when the test specimen cracked, where the cracks radiated outwardly from point of failure and the sample showed very little to no elongation at the point of failure. The "ARM Ductility %" was calculated as follows: 100×[(number of ductile failures)/(total number of all failures)]. The "ARM Mean Failure Energy (ft.lbs)" was calculated by multiplying the drop height (ft) by the nominal dart weight (lbs).

Samples were impact tested using a drop weight impact tester; impact darts available consisted of 10 lb (4.54 kg), 15 lb (6.80 kg), 20 lb (9.07 kg) or 30 lb (13.6 kg) darts. All impact darts had a rounded dart tip having a diameter of 1.0±0.005 inch (2.54 cm), the dart tip transitioned into a lower cylindrical shaft (1.0 inch diameter), the length of the lower cylindrical shaft (to dart tip) was 4.5 inch (11.4 cm). Impact darts included an upper cylindrical shaft having a diameter of 2.0 inch (5.08 cm), the length of the upper cylinder shaft varied depending on the desired weight of the dart, e.g., 10.5 inch (26.7 cm) or 16.5 inch (41.9 cm) for the 10 lb or 20 lb dart, respectively. Preferably a dart weight selected such that the drop height is between 2.5 ft and 7.5 ft (0.8 m to 2.3 m). Test specimens were oriented in the impact tester such that the falling dart impacted the surface of the part that was in contact with the mold (when molded).

If the sample did not fail at a given height and weight, either the height or weight was increased incrementally until part failure occurred.

Once failure occurred, the height or weight is decreased by the same increment and the process is repeated. The "ARM Mean Failure Energy" was calculated by multiplying the drop height (ft) by the nominal dart weight (lbs). After impact, both the upper and lower surface of the specimen were inspected for failure. For the ethylene interpolymer products disclosed herein, a ductile failure was desired failure mode.

In the ARM Impact test, a rotomolded part with a thickness of 0.125 inches, having an ARM Mean Failure Energy equal to or greater than or equal to 100 ft.lbs in combination with an ARM Ductility equal to or greater than or equal to 50% was considered a good part, i.e., the part passed the ARM Impact test. To be clear, a wall structure having an ARM Mean Failure Energy≥100 ft.lbs and an ARM Ductility≥50% passed the ARM Impact test. In contrast, a wall structure having an ARM Mean Failure Energy<100 ft.lbs or an ARM Ductility <50% failed the ARM Impact test.

Polymerization

The following examples are presented for the purpose of illustrating selected embodiments of this disclosure; it being understood, that the examples presented do not limit the claims presented.

Disclosed examples were prepared using two reactors in series using conditions to generate a homopolymer having a molecular weight below 40,000, which favors an increase in the overall comonomer content. A molecular weight value of 40,000 was identified as a threshold value below which crystallinity (density) becomes exponentially dependent upon changes in molecular weight.

The ethylene interpolymer products described in the Examples section were produced in a continuous solution polymerization pilot plant having reactors arranged in a series configuration. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 4.8 gallons (18 L). Examples of ethylene interpolymer products were produced using an R1 pressure from about 14 MPa to about 18 MPa; R2 was operated at a lower pressure to facilitate continuous flow from R1 to R2. R1 and R2 were operated in series mode, wherein the first exit stream from R1 flowed directly into R2. Both CSTRs were agitated to give conditions in which the reactor contents were well mixed. The process was operated continuously by feeding fresh process solvent, ethylene, 1-octene and hydrogen to the reactors.

The single site catalyst components used (Catalyst Formulation 1) were: component (i), cyclopentadienyl tri(tertiary butyl)phosphinimine titanium dichloride, ($Cp[(t-Bu)_3PN]TiCl_2$), hereafter PIC-1; component (ii), methylaluminoxane (MMAO-07); component (iii), trityl tetrakis(pentafluoro-phenyl)borate; and component (iv), 2,6-di-tert-butyl-4-ethylphenol. The single site catalyst component solvents used were methylpentane for components (ii) and (iv) and xylene for components (i) and (iii). The quantity of PIC-1 added to R1, "R1 (i) (ppm)" is shown in Table 1. The mole ratios of the single site catalyst components employed to produce Examples 1-3 are shown in the below Table.

|  | Example 1 | Example 2 | Example 3 |
|---|---|---|---|
| R1 (ii)/(i) mole ratio [(MMAO-07)/(PIC-1)] | 100 | 100 | 100 |
| R1 (iv)/(ii) mole ratio [(2,6-di-tert-butyl-4-ethylphenol)/(MAMO-07)] | 0 | 0 | 0.4 |
| R1 (iii)/(i) mole ratio [(trityl tetrakis(pentafluoro-pheny)b orate)/(PIC-1)] | 1.2 | 1.1 | 1.1 |

The single site catalyst formulation was injected into R1 using process solvent, the flow rate of this catalyst containing solvent was about 30 kg/h.

The in-line Ziegler-Natta catalyst formulation was prepared from the following components: component (v), butyl ethyl magnesium; component (vi), tertiary butyl chloride; component (vii), titanium tetrachloride; component (viii), diethyl aluminum ethoxide; and component (ix), triethyl aluminum. Methylpentane was used as the catalyst component solvent. The in-line Ziegler-Natta catalyst formulation was prepared using the following steps. In step one, a solution of triethylaluminum and dibutylmagnesium ((triethylaluminum)/(dibutylmagnesium) in a molar ratio of 20:1) was combined with a solution of tertiary butyl chloride and allowed to react for about 30 seconds (HUT-1); in step two, a solution of titanium tetrachloride was added to the mixture formed in step one and allowed to react for about 14 seconds (HUT-2); and in step three, the mixture formed in step two was allowed to reactor for an additional 3 seconds (HUT-3) prior to injection into R2. The in-line Ziegler-Natta procatalyst formulation was injected into R2 using process solvent, the flow rate of the catalyst containing solvent was about 49 kg/hr. The in-line Ziegler-Natta catalyst formulation was formed in R2 by injecting a solution of diethyl aluminum ethoxide into R2. The quantity of titanium tetrachloride "R2 (vii) (ppm)" added to reactor 2 (R2) is shown in Table 1. In Examples 1-3, the following mole ratios shown in the below table were used to synthesize the in-line Ziegler-Natta catalyst.

|  | Example 1 | Example 2 | Example 3 |
|---|---|---|---|
| R2 (vi)/(v) mole ratio | 1.58 | 1.58 | 1.98 |
| R2 (viii)/(vii) mole ratio | 1.35 | 1.35 | 1.35 |
| R2 (ix)/(vii) mole ratio | 0.35 | 0.35 | 0.35 |

In all of the Examples disclosed, 100% of the diethyl aluminum ethoxide was injected directly into R2.

Additional information on the manufacturing conditions for the disclosed and comparative polyethylene compositions are described in Table 1. For the disclosed examples 1, 2 and 3, the volume of the first reactor was 12 liters and the volume of the second reactor was 22 liters. These are the pilot plant scales. The first reactor was operated at a pressure of 10500-35000 kPa and the second reactor was operated at a lower pressure to facilitate continuous flow from the first reactor to the second. The solvent was methylpentane. The process operates using continuous feed streams. For the comparative examples 1 to 5, the volume of the first reactor was 12 liters and the volume of the second reactor was 22 liters. These are the pilot plant scales. The first reactor was operated at a pressure of 10500-35000 kPa and the second reactor was operated at a lower pressure to facilitate continuous flow from the first reactor to the second. The solvent was methylpentane. The process operates using continuous feed streams. Comparative examples 6 is a commercial rotomolding grade. Comparative example 7 is a NOVA Chemicals commercial product. Comparative example 8 is a commercial DOW sold under the label of CONTINUUM™ DMDC-1250.

A computer-generated version of an ethylene interpolymer product is illustrated in Table 2 (using methods described in U.S. Pat. No. 9,695,309) in order to estimate the properties of the first and second ethylene interpolymers made in each of the first (R1) and the second (R2) polymerization reactors. This simulation was based on fundamental kinetic models (with kinetic constants specific for each catalyst formulation) as well as the feed and reactor conditions presented in Table 1 and used for the production of the disclosed examples 1, 2, and 3. The simulation was further based on the configuration of the solution pilot plant described above which was used to produce the ethylene interpolymer products. Simulated version of Examples 1, 2 and 3 was synthesized using a single-site catalyst formulation in R1 and an in-line Ziegler-Natta catalyst formulation in R2.

Disclosed and comparative polyethylene composition properties are described in Table 3, Table 4, and Table 5. The ethylene interpolymer product according to the present disclosure has a density of 0.948, a melt index from 1.0-1.4 g/10 min, a polydispersity ($M_w/M_n$) less than 5, and a reverse comonomer distribution. The ethylene interpolymer product includes a blend of a low molecular weight high density component made using a Ziegler-Natta catalyst (ZN), i.e., a heterogeneous catalyst formulation, and a high molecular weight low density component made using a single-site catalyst (SSC) formulation. The ethylene interpolymer product according to the present disclosure has excellent ESCR performance (ESCR 10>90 hours, ESCR A100>1000 hours) and a polydispersity index ($M_w/M_n$) less than 5. The toughness is evaluated using IZOD impact strength on compression molded plaques. The toughness is greater than 3.5 ft.lb/in. The ethylene interpolymer product according to the present disclosure has a balance of toughness and ESCR that is unmatched by commercial products having comparable melt index/density specifications, such as commercial high density products listed here as comparative examples 7 and 8, for example. The ethylene interpolymer product according to the present disclosure may have improved rotomolding processability as demonstrated by ductile impact failure mode of rotomolded part tested at low temperatures (e.g., −40° C.).

Rotomolding

Rotomolding trials were carried out on the disclosed examples. Additives were incorporated in the preparation of each example assessed for rotomolding performance by use of melt extrusion and ground into fine powder (35-mesh). Disclosed example 1 was prepared by melt compounding additives, in the form of a masterbatch using a Leistritz LSM 30.34 twin screw extruder. The composition shown in disclosed example 1 contained the following additives (All amounts shown in parts per million by weight of the polyethylene): Hindered phenol (Irganox 1076): 574 ppm total; Phosphite (CAS Registry number 31570-04-4): 912 ppm; Diphosphite (CAS Registry number 154862-43-8): 450 ppm target amount; Hydroxylamine (CAS Registry number 143925-92-2): 250 ppm target amount; Hindered Amine Light Stabilizer (HALS Chimassorb 944): 750 ppm target amount; Hindered Amine Light Stabilizer (HALS Tinuvin 622): 750 ppm target amount; Zinc Oxide: 750 ppm target amount. Disclosed example 3 was prepared by melt compounding additives, in the form of a masterbatch using a Coperion ZSK26 twin screw extruder. The composition shown in disclosed example 3 contained the following additives (All amounts shown in parts per million by weight of the polyethylene): Hindered phenol (IRGANOX® 1076): 561 ppm total; Phosphite (CAS Registry number 31570-04-4): 813 ppm; Diphosphite (CAS Registry number 154862-43-8): 429 ppm target amount; Hydroxylamine (CAS Registry number 143925-92-2): 250 ppm target amount; Hindered Amine Light Stabilizer (HALS Chimassorb 944): 750 ppm target amount; Hindered Amine Light Stabilizer (HALS Tinuvin 622): 750 ppm target amount; Zinc Oxide: 750 ppm target amount.

Rotomolding trials were carried out on the comparative examples. Additives were incorporated in the preparation of each example assessed for rotomolding performance by use of melt extrusion. Example 7 was prepared by melt compounding additives, in the form of a masterbatch using a Coperion ZSK26 twin screw extruder. The composition shown in example 7 contained the following additives (All amounts shown in parts per million by weight of the polyethylene): Hindered phenol (Irganox 1010): 500 ppm target amount; Phosphite (CAS Registry number 31570-04-4): 1550 ppm; Diphosphite (CAS Registry number 154862-43-8): 450 ppm target amount; Hydroxylamine (CAS Registry number 143925-92-2): 250 ppm target amount; Hindered Amine Light Stabilizer (HALS Chimassorb 944): 750 ppm target amount; Hindered Amine Light Stabilizer (HALS Tinuvin 622):Zinc Oxide: 750 ppm target amount. Example 8 was prepared by melt compounding additives, in the form of a masterbatch using a Coperion ZSK26 twin screw extruder. The composition shown in example 8 contained the following additives (All amounts shown in parts per million by weight of the polyethylene): Phosphite (CAS Registry number 31570-04-4): 1824 ppm; Diphosphite (CAS Registry number 154862-43-8): 508 ppm; Hydroxylamine (CAS Registry number 143925-92-2): 250 ppm target amount; Hindered Amine Light Stabilizer (HALS Chimassorb 944): Hindered Amine Light Stabilizer (HALS Tinuvin 622): 750 ppm target minimum amount; Zinc Oxide: 750 ppm target minimum amount.

FIG. 1 illustrates the IZOD impact strength (ft.lb/inch) versus the Environmental Stress Crack Resistance (ESCR) (hr) of ethylene interpolymer polymers according to the present disclosure and comparative examples.

Figure 2:
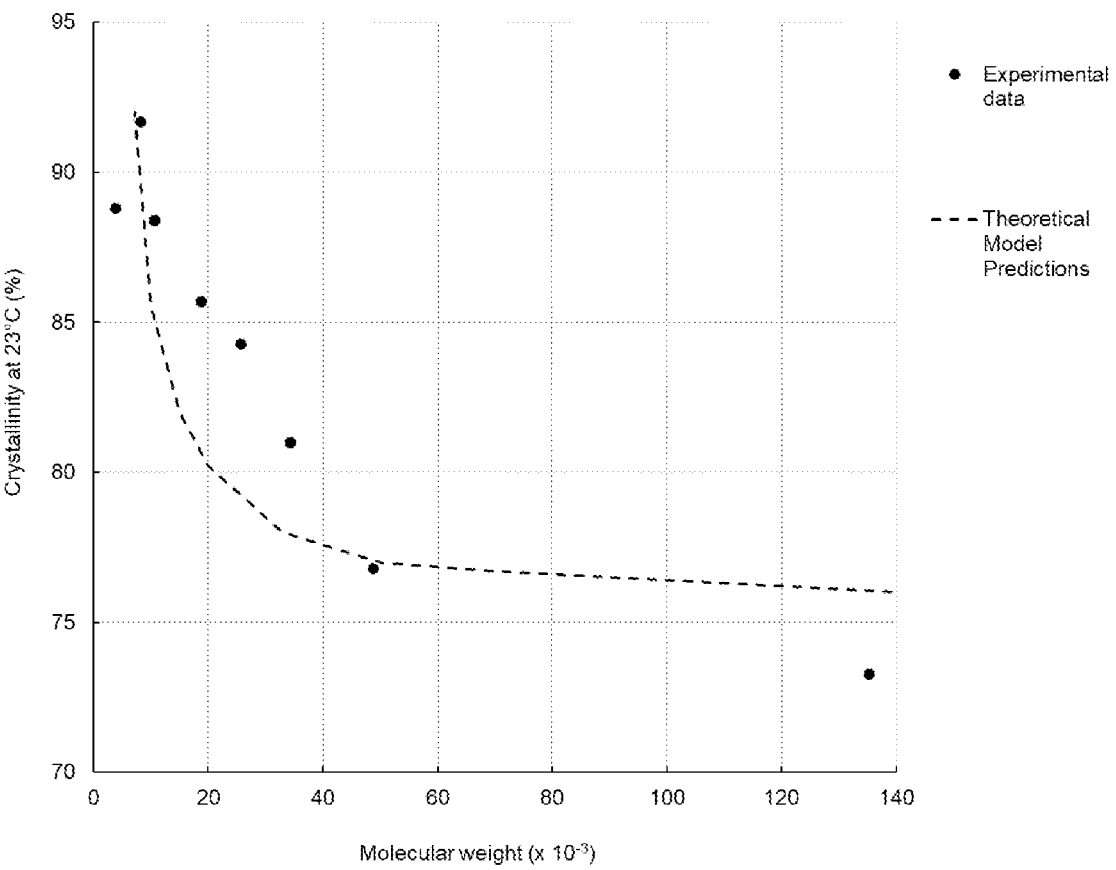
FIG. 2 illustrates the crystallinity at $23°$ C. versus molecular weight of an ethylene interpolymer polymer according to data published in the literature by Tung and Buckser "Effect of molecular weight on the crystallinity of polyethylene" (1958) J. Phys. Chem., vol 62, p. 1520.

FIG. 2 illustrates the crystallinity at 23° C. versus molecular weight of an ethylene interpolymer polymer. See Tung and Buckser "Effect of molecular weight on the crystallinity of polyethylene" (1958) J. Phys. Chem., vol 62, p. 1520.

Figure 3:
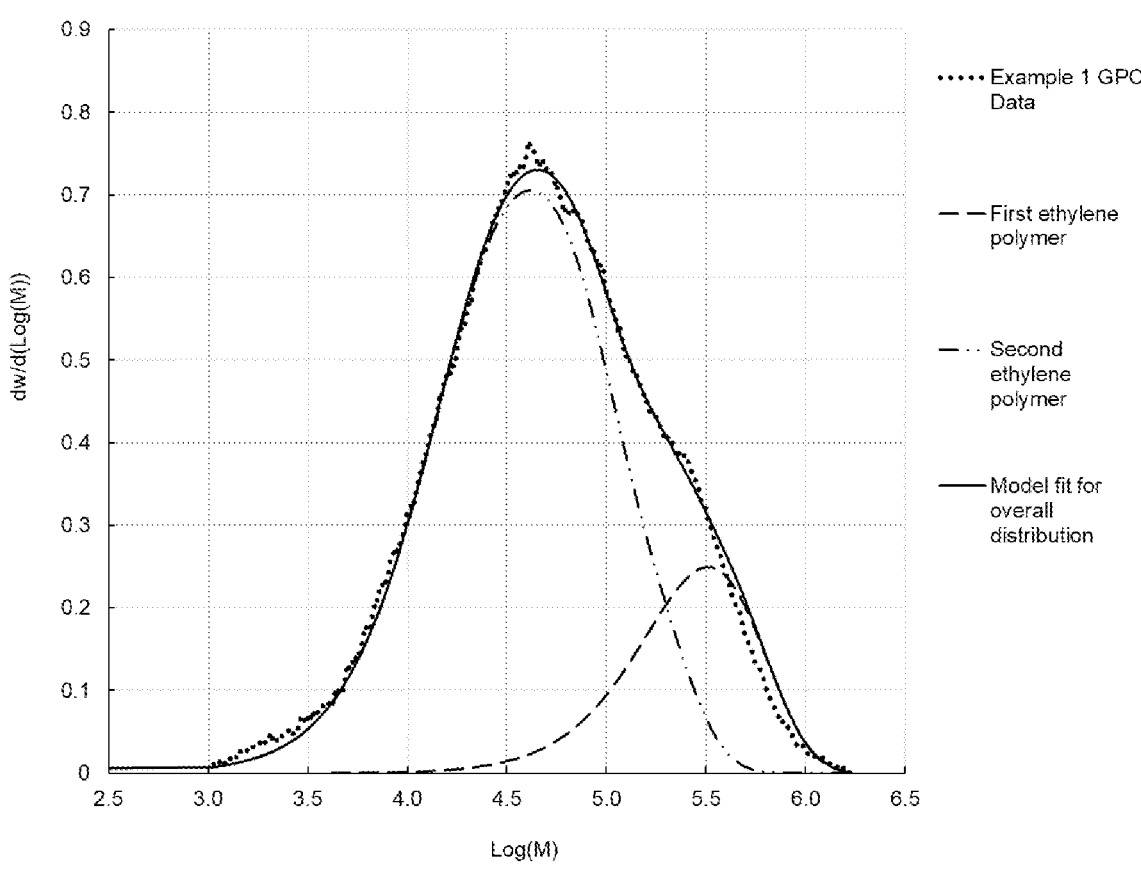
FIG. 3 illustrates the molecular weight distribution obtained by GPC measurement of an ethylene interpolymer polymer according to the present disclosure (disclosed example 1) and the deconvolution results based on multiple Flory's molecular weight distribution functions. First ethylene interpolymer is modeled using a single Flory distribution function. Second ethylene interpolymer is estimated using a four-distribution model.

FIG. 3 illustrates the molecular weight distribution obtained by GPC measurement of an ethylene interpolymer polymer according to the present disclosure (disclosed example 1) and the deconvolution results based on multiple Flory's molecular weight distribution functions. First ethylene interpolymer is modeled using a single Flory distribution function. Second ethylene interpolymer is estimated using a four-distribution model.

Figure 4:
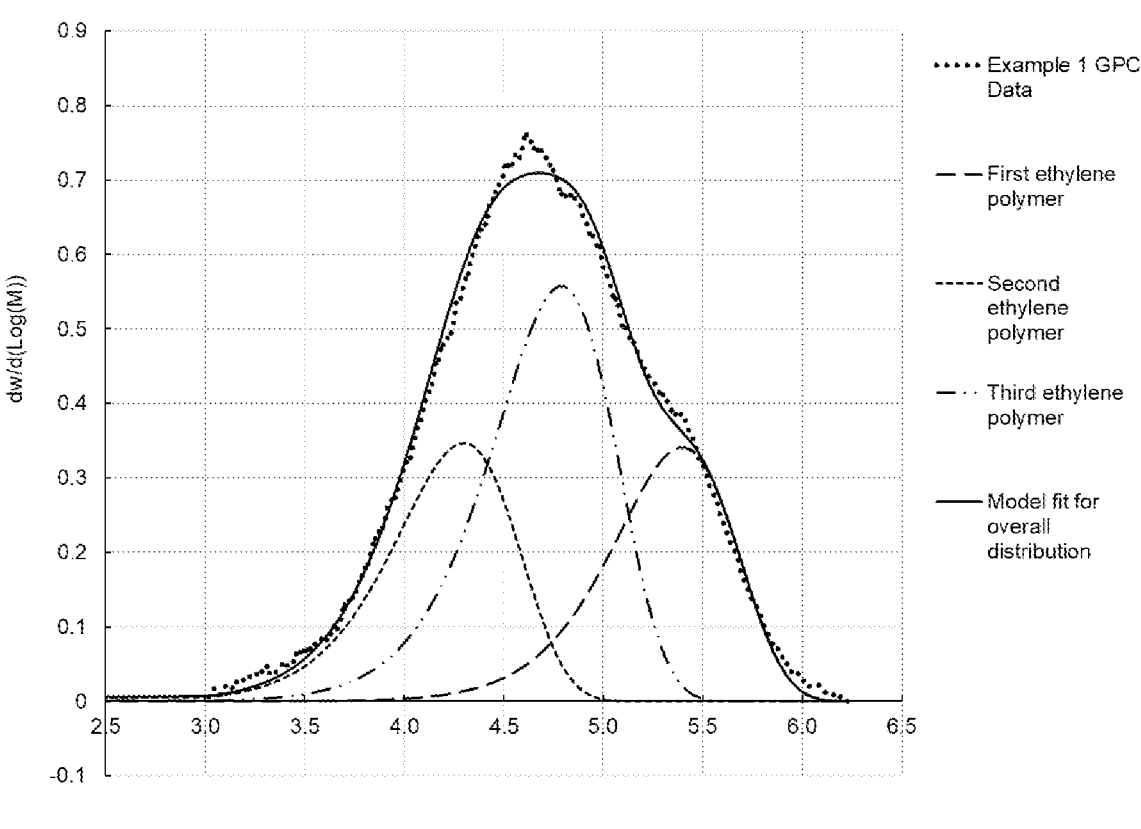
FIG. 4 illustrates the molecular weight distribution obtained by GPC measurement of an ethylene interpolymer polymer according to the present disclosure (Example 1) and the deconvolution results based on three idealized Flory's molecular weight distribution functions.

FIG. 4 illustrates the molecular weight distribution obtained by GPC measurement of an ethylene interpolymer polymer according to the present disclosure (Example 1) and the deconvolution results based on three idealized Flory's molecular weight distribution functions.

Figure 5:
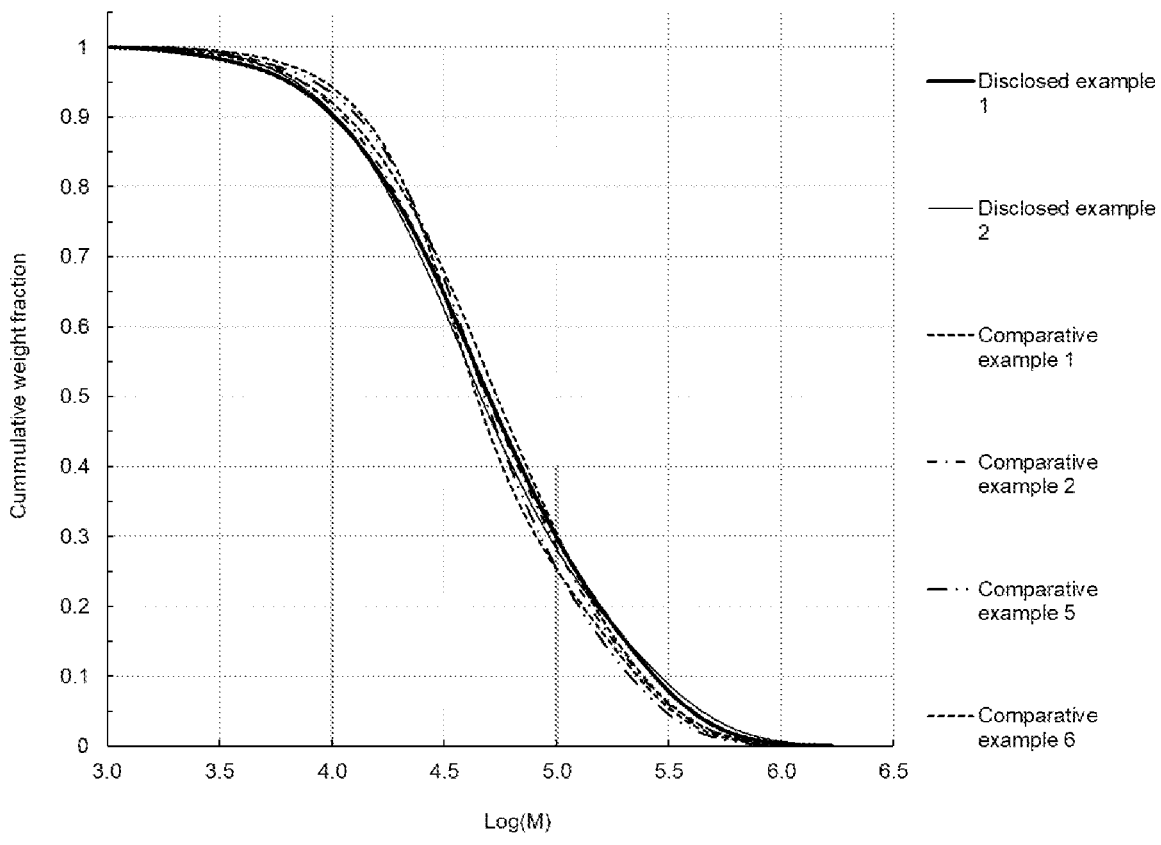
FIG. 5 illustrates the cumulative weight fraction of an ethylene interpolymer polymer according to the present disclosure (Example 1 and Example 2) and comparative examples 1, 2, 5 and 6.
Figure 6:
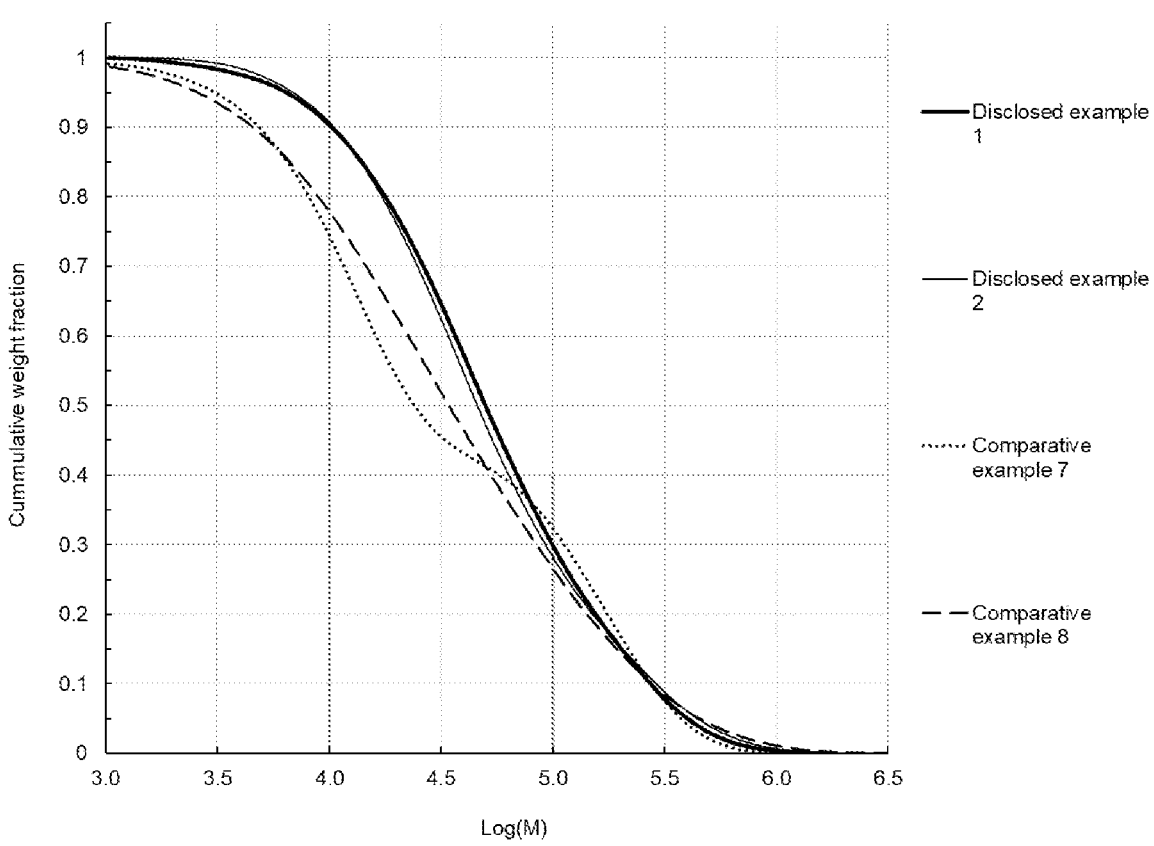
FIG. 6 illustrates the cumulative weight fraction of an ethylene interpolymer polymer according to the present disclosure (Example 1 and Example 2) and comparative examples 7 and 8.

FIG. 5 illustrates the cumulative weight fraction of an ethylene interpolymer polymer according to the present disclosure (Example 1 and Example 2) and comparative examples 1, 2, 5 and 6.

Without wishing to be bound to any particular theory, the Ziegler-Natta component is believed to provide continuity in the interpolymer product. The interpolymer product according to the present disclosure has been shown to be beneficial for maintaining better toughness and ESCR performance relative to conventional compositions.

The interpolymer product having improved ESCR and toughness according to the present disclosure may include tie molecules, which are favored with an increase in molecular weight combined with an increase in comonomer incorporation.

Referring to Tables 2, 3, and 5, without wishing to be bound to any particular theory, it is believed that molecular weight and molecular weight distribution have minimal effect on ESCR and toughness, however, the molecular weight of the high-density fraction and overall comonomer incorporation affect ESCR performance.

While comonomer content may influence the density, the effect of molecular weight becomes exponentially important at values below 50,000. The interpolymer product according to the present disclosure may include a low molecular weight component having a density higher than normally expected based solely on composition (R2 component). To achieve the desired overall composition density, the amount of comonomer in the high molecular weight fraction may be increased. This results in an interpolymer product having a reverse comonomer distribution and improved ESCR and toughness. There are, however, limits on the amount of low a molecular weight fraction that may be included in the interpolymer product to avoid plasticizing effects and plate-out issues during and after the conversion process.

The interpolymer product according to the present disclosure was prepared by selecting reactor conditions that (1) force the molecular weight of the high-density component to remain below a threshold of 40,000; (2) minimize comonomer incorporation in the high-density component; and (3) increase comonomer incorporation in the high molecular weight component; (4) while maintaining the polydispersity index of the overall composition below 5.

The interpolymer product according to the present disclosure may include ethylene copolymers having a density greater than 0.948 g/cm$^3$ that may be suitable for rotational molding applications having high ESCR requirements. The interpolymer product may be made using a single-site catalyst (SSC) and Ziegler-Natta catalyst (ZN) in a dual reactor technology. The SSC technology may provide better control of molecular weight and comonomer distribution. The ZN component may provide continuity in the overall molecular composition, which contributes to the rotomoldability and toughness. The interpolymer product according to the present disclosure has high molecular weight and high comonomer content which improves both toughness and ESCR performance. When compared to conventional interpolymer products, the interpolymer product according to the present disclosure have an unusually high toughness-ESCR balance at comparable melt index and density. Without wishing to be bound to any particular theory, it is believed the suitability of the interpolymer product having a high density according to the present disclosure for rotational molding applications may relate to the increase in the overall comonomer content while maintaining the desired density. This may be achieved by having the molecular weight of the high-density component at a value below 40,000 because the crystallinity (density) becomes exponentially dependent upon changes in molecular weight below this value. The improved toughness and ESCR performance may relate to the control of the low molecular weight component.

The following aspects are described in this disclosure:

Aspect 1. An interpolymer product including: a first ethylene interpolymer including ethylene and an α-olefin having a weight-average molecular weight ($M_w$) of greater than 200,000 and a density of less than 0.930 g/cm$^3$, and a second ethylene interpolymer including ethylene and an $\alpha$-olefin wherein the second ethylene interpolymer includes a $M_w$ of less than 70,000 and a density of greater than 0.930 g/cm$^3$; and wherein the interpolymer product includes an environmental stress crack resistance (ESCR), measured according to ASTM D1693, Condition B, 10% IGEPAL CO-630, of greater than 90 hours.

Aspect 2. The interpolymer product of any of the foregoing claims, wherein the density of the interpolymer product is from 0.94-0.97 g/cm$^3$; the density of the interpolymer product is from 0.945-0.965 g/cm$^3$; or the density of the interpolymer product is from 0.947-0.955 g/cm$^3$.

Aspect 3. The interpolymer product of any of the foregoing aspects, wherein the ESCR of the interpolymer product is from 90-500 hours; or the ESCR of the interpolymer product is from 100-400 hours.

Aspect 4. The interpolymer product of any of the foregoing aspects, wherein the IZOD impact strength of the interpolymer product is greater than 2 ft.lb/inch; the IZOD impact strength of the interpolymer product is from 2-10 ft.lb/inch; or the IZOD impact strength of the interpolymer product is from 2-5 ft.lb/inch.

Aspect 5. The interpolymer product of any of the foregoing aspects including a tensile impact of greater than 140 ft.lb/in$^2$; or a tensile impact from 140-350 ft.lb/in$^2$.

Aspect 6. The interpolymer product of any of the foregoing aspects including a melt index ($I_2$) of greater than 0.5 g/10 min; a melt index ($I_2$) of from 0.8-8 g/10 min; or a melt index ($I_2$) of from 0.8-5 g/10 min.

Aspect 7. The interpolymer product of any of the foregoing aspects including a melt flow ratio, $I_{21}/I_2$, from 30-70; or a melt flow ratio, $I_{21}/I_2$, from 35-60.

Aspect 8. The interpolymer product of any of the foregoing aspects including a flex modulus (1% secant) of at least 1,000 MPa; or a flex modulus (1% secant) from 1,100-1,500 MPa.

Aspect 9. The interpolymer product of any of the foregoing aspects including a total vinyl unsaturation of greater than 0.02 vinyl groups per 1,000 carbon atoms; or a total vinyl unsaturation of from 0.02-1.0 vinyl groups per 1,000 carbon atoms.

Aspect 10. The interpolymer product of any of the foregoing aspects including a long chain branching frequency of 0.

Aspect 11. The interpolymer product of any of the foregoing aspects including a short chain branching frequency from 0.5-5.0; a short chain branching frequency from 0.5-2.9; or a short chain branching frequency from 3.0-4.0.

Aspect 12. The interpolymer product of any of the foregoing aspects, including a CDBI$_{50}$ greater than 70%; or a CDBI$_{50}$ from 70-90%.

Aspect 13. The interpolymer product of any of the foregoing aspects, wherein the $\alpha$-olefin includes a $C_3$-$C_{12}$ $\alpha$-olefin or a combination thereof; the $\alpha$-olefin includes an $\alpha$-olefin selected from 1-hexene, 1-octene, or a mixture thereof; the $\alpha$-olefin includes 1-hexene; or the $\alpha$-olefin includes 1-octene.

Aspect 14. The interpolymer product of any of the foregoing aspects, wherein the $\alpha$-olefin includes 0.05-5 mol. % of the interpolymer product; the $\alpha$-olefin includes 0.1-5 mol. % of the interpolymer product; the $\alpha$-olefin includes 0.5-3.0 mol. % of the interpolymer product; the $\alpha$-olefin includes 0.5-1.5 mol. % of the interpolymer product; the $\alpha$-olefin includes 0.1-0.5 mol. % of the interpolymer product; the $\alpha$-olefin includes 2.7 mol. % of the interpolymer product; or the $\alpha$-olefin includes 0.7 mol. % of the interpolymer product.

Aspect 15. The interpolymer product of any of the foregoing aspects including a number-average molecular weight ($M_n$) from 12,000-45,000; a number-average molecular weight ($M_n$) from 15,000-40,000; or a number-average molecular weight ($M_n$) from 20,000-30,000.

Aspect 16. The interpolymer product of any of the foregoing aspects including a z-average molecular weight ($M_z$) from 280,000-500,000; or a z-average molecular weight ($M_z$) from 305,000-400,000.

Aspect 17. The interpolymer product of any of the foregoing aspects including a polydispersity ($M_w/M_n$) of from 3-7; a polydispersity ($M_w/M_n$) of from 4-7.

Aspect 18. The interpolymer product of any of the foregoing aspects including a Dilution Index, Yd, >−1.0; a Dilution Index, Yd, less than 0; or a Dilution Index, Yd, from −10 to 0.

Aspect 19. The interpolymer product of any of the foregoing aspects including a primary structure parameter (PSP2) from 2-8.9 as determined by the GPC-FTIR Branching distribution profile; a primary structure parameter (PSP2) from 4-8 as determined by the GPC-FTIR Branching distribution profile; a primary structure parameter (PSP2) from 2-8.9 as determined by the branching content (FTIR); or a primary structure parameter (PSP2) from 4-8 as determined by the branching content (FTIR).

Aspect 20. The interpolymer product of any of the foregoing aspects including, based on total weight percent of the interpolymer product: 10-45 wt. % of the first interpolymer; and 55-90 wt. % of the second interpolymer.

Aspect 21. The interpolymer product of any of the foregoing aspects including, based on total weight percent of the interpolymer product: 10-40 wt. % of the first interpolymer; and 60-90 wt. % of the second interpolymer.

Aspect 22. The interpolymer product of any of the foregoing aspects including, based on total weight percent of the interpolymer product: 15-30 wt. % of the first interpolymer; and 70-85 wt. of the second interpolymer.

Aspect 23. The interpolymer product of any of the foregoing aspects, wherein the first interpolymer includes 10-45 wt. % of the interpolymer product; 10-35 wt. % of the interpolymer product; or 15-30 wt. % of the interpolymer product.

Aspect 24. The interpolymer product of any of the foregoing aspects, wherein the first interpolymer includes a $M_w$ of from 200,000-500,000; a $M_w$ of from 230,000-450,000; or a $M_w$ of from 250,000-400,000.

Aspect 25. The interpolymer product of any of the foregoing aspects, wherein the first interpolymer includes a $M_n$ from 100,000-200,000; or a $M_n$ from 120,000-180,000.

Aspect 26. The interpolymer product of any of the foregoing aspects, wherein the first interpolymer includes a $M_z$ from 320,000-650,000; or a $M_z$ from 350,000-545,000.

Aspect 27. The interpolymer product of any of the foregoing aspects, wherein the first interpolymer includes a polydispersity ($M_w/M_n$) from 1.0-3.0; or a polydispersity ($M_w/M_n$) from 1.75-2.7.

Aspect 28. The interpolymer product of any of the foregoing aspects, wherein the first interpolymer includes a short chain branching frequency from 1.0-5.0; or a short chain branching frequency from 1.3-3.5.

Aspect 29. The interpolymer product of any of the foregoing aspects, wherein the first interpolymer includes a melt index ($I_2$) from up to 0.4 g/10 min; or a melt index ($I_2$) from 0.0001-0.4 g/10 min; or a melt index ($I_2$) from 0.001-0.1 g/10 min.

Aspect 30. The interpolymer product of any of the foregoing aspects, wherein the first interpolymer includes a density of from 0.90-0.93; or a density of from 0.910-0.929 g/cm$^3$.

Aspect 31. The interpolymer product of any of the foregoing aspects, wherein the second interpolymer includes 55-90 wt. % of the interpolymer product; or 65-90 wt. % of the interpolymer product; or 70-85 wt. % of the interpolymer product.

Aspect 32. The interpolymer product of any of the foregoing aspects, wherein the second interpolymer includes a $M_w$ of from 30,000-70,000; or a $M_w$ of from 40,000-60,000.

Aspect 33. The interpolymer product of any of the foregoing aspects, wherein the second interpolymer includes a $M_n$ from 10,000-30,000; a $M_n$ from 12,000-25,000.

Aspect 34. The interpolymer product of any of the foregoing aspects, wherein the second interpolymer includes a $M_z$ from 70,000-125,000; or a $M_z$ from 80,000-115,000.

Aspect 35. The interpolymer product of any of the foregoing aspects, wherein the second interpolymer includes a polydispersity ($M_w/M_n$) from 2.0-7.0; or a polydispersity ($M_w/M_n$) from 2.5-5.0.

Aspect 36. The interpolymer product of any of the foregoing aspects, wherein the second interpolymer includes a short chain branching frequency from 0.01-1.5; a short chain branching frequency from 0.01-1.0; or a short chain branching frequency from 0.1-1.5.

Aspect 37. The interpolymer product of any of the foregoing aspects, wherein the second interpolymer includes a melt index from 1-500 g/10 min; or a melt index from 5-200 g/10 min; a melt index from 1-50 g/10 min; or a melt index from 10-100 g/10 min.

Aspect 38. The interpolymer product of any of the foregoing aspects, wherein the second interpolymer includes a density of from 0.93-0.98; or a density of from 0.95-0.97.

Aspect 39. An interpolymer product of any of the foregoing aspects including: a first ethylene interpolymer including ethylene and an α-olefin having a weight-average molecular weight ($M_w$) from 300,000-450,000 and a density from 0.900-0.930 g/cm$^3$, and a second ethylene interpolymer including ethylene and an α-olefin wherein the second ethylene interpolymer has a $M_w$ from 30,000-70,000 and a density from 0.930-0.980; and wherein the interpolymer product has: an environmental stress crack resistance (ESCR), measured according to ASTM D1693, Condition B, 10% IGEPAL CO-630, from greater than 90 hours; an IZOD impact strength from 3.0-5.0 ft.lb/inch; a density from 0.945-0.960; a melt index from 0.9-3.0; and a melt flow ratio, $I_{21}/I_2$, from 35-65.

Aspect 40. An interpolymer product of any of the foregoing aspects including: a first ethylene interpolymer including ethylene and an α-olefin having a weight-average molecular weight ($M_w$) of greater than 210,000 and a density of less than 0.930 g/cm$^3$, and a second ethylene interpolymer including ethylene and an α-olefin wherein the second ethylene interpolymer has a $M_w$ of less than 70,000 and a density of greater than 0.930 g/cm$^3$; and wherein the interpolymer product includes: an environmental stress crack resistance (ESCR), measured according to ASTM D1693, Condition B, 10% IGEPAL CO-630, of greater than 200 hours; an IZOD impact strength from 5.0-8.0 ft.lb/inch; a density from 0.945-0.955; a melt index from 0.9-5.0; and a melt flow ratio, $I_{21}/I_2$, from 40-65.

Aspect 41. An interpolymer product of any of the foregoing aspects including: an environmental stress crack resistance (ESCR), measured according to ASTM D1693, Condition B, 10% IGEPAL CO-630, of greater than 300 hours; an IZOD impact strength from 5.0-8.0 ft.lb/inch; a density from 0.945-0.953; a melt index from 1.0-2.0; and a melt flow ratio, $I_{21}/I_2$, from 45-60.

Aspect 42. An interpolymer product of any of the foregoing aspects including: an environmental stress crack resistance (ESCR), measured according to ASTM D1693, Condition B, 10% IGEPAL CO-630, of greater than 90 hours; an IZOD impact strength from 3.0-5.0 ft.lb/inch; a density from 0.947-0.960; a melt index from 0.9-3.0; and a melt flow ratio, $I_{21}/I_2$, from 35-65.

Aspect 43. A rotomolded article of any of the foregoing aspects including a wall structure including at least one layer including an ethylene interpolymer product including: a first ethylene interpolymer including ethylene and an α-olefin having a weight-average molecular weight ($M_w$) of greater than 200,000 and a density of less than 0.930 g/cm$^3$, and a second ethylene interpolymer including ethylene and an α-olefin wherein the second ethylene interpolymer has a $M_w$ of less than 70,000 and a density of greater than 0.930 g/cm$^3$; and wherein the interpolymer product has an environmental stress crack resistance (ESCR), measured according to ASTM D1693, Condition B, 10% IGEPAL CO-630, of greater than 90 hours.

Aspect 44. The rotomolded article of any of the foregoing aspects selected from a toy, a bin, a container, a helmet, a boat, or a large tank.

Aspect 45. A closure for a bottle, wherein the closure includes: a first ethylene interpolymer including ethylene and an α-olefin having a weight-average molecular weight ($M_w$) of greater than 200,000 and a density of less than 0.930 g/cm$^3$; and a second ethylene interpolymer including ethylene and an α-olefin wherein the second ethylene interpolymer has a $M_w$ of less than 70,000 and a density of greater than 0.930 g/cm$^3$, and wherein the interpolymer product includes an environmental stress crack resistance (ESCR), measured according to ASTM D1693, Condition B, 10% IGEPAL CO-630, of greater than 90 hours.

Aspect 46. The closure of any of the foregoing aspects made by compression molding or injection molding.

Aspect 47. The closure of any of the foregoing aspects including a screw cap.

Aspect 48. A composition as substantially described in the specification and accompanying drawings.

Aspect 49. A blend polymer composition as substantially described in the specification and accompanying drawings.

Aspect 50. A bimodal polyethylene copolymer composition as substantially described in the specification and accompanying drawings.

Aspect 51. An interpolymer product as substantially described in the specification and accompanying drawings.

Aspect 52. An article including the composition as substantially described in the specification and accompanying drawings.

Aspect 53. A rotomolded article including the composition as substantially described in the specification and accompanying drawings.

Aspect 54. A rotomolded article including a wall structure including the composition as substantially described in the specification and accompanying drawings.

Aspect 55. A monolayer film including the composition as substantially described in the specification and accompanying drawings.

Aspect 56. A multilayer film including the composition as substantially described in the specification and accompanying drawings.

Aspect 57. A method of making the composition as substantially described in the specification and accompanying drawings.

Aspect 58. A method of making the interpolymer product as substantially described in the specification and accompanying drawings.

Aspect 59. A method of making the article as substantially described in the specification and accompanying drawings.

Aspect 60. A method of making the film as substantially described in the specification and accompanying drawings.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

References: U.S. Pat. App. Pub. No. 2018/230,298; U.S. Pat. Nos. 7,153,909; 7,307,126; 7,396,881; 8,076,421; 8,101,687; 8,492,498; 8,791,205; 8,829,115; 9,056,970; 9,102,819; 9,512,283; 9,695,309; and 9,758,653.

While particular embodiments have been illustrated and described, it would be obvious to those skilled in the art that various other changes and modifications may be made without departing from the spirit and scope of the disclosure. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

TABLE 1

| | | | | Reactor Conditions | | | | |
| --- | --- | --- | --- | --- | --- | --- | --- | --- |
| | Example (1) | Example (2) | Example (3) | Comp. Example 1 (U.S. Pat. No. 9,695,309 Ex 73) | Comp. Example 2 (U.S. Pat. No 9,695,309 Ex 71) | Comp. Example 3 | Comp. Example 4 (Ex. #3 in U.S. Pat. No 9,982,077) | Comp. Example 5 |
| Ethylene split between first reactor (R1), second reactor (R2) | 22/78 | 22/78 | 30/70 | 30/70 | 35/65 | 20/80 | 0.35/0.65 | 0.35/0.65 |
| Octene split between first Reactor (R1) and second reactor (R2), and third reactor (R3) | 1/0 | 1/0 | 1/0 | 1/0 | 1/0 | 1/0 | 1/0 | 1/0 |
| Octene to ethylene ratio in fresh feed | 0.030 | 0.037 | 0.038 | 0.043 | 0.052 | 0.016 | 0.021 | 0.028 |
| Hydrogen in reactor 1 (ppm) | 0.3 | 0.2 | 0.9 | 0.9 | 1.2 | 0.3 | 0.8 | 1.2 |
| Hydrogen in reactor 2 (ppm) | 22.0 | 31.9 | 30.0 | 24.0 | 34.0 | 18.5 | 4.5 | 6.0 |
| Reactor 1 temperature (° C.) | 133 | 131 | 136 | 140 | 135 | 137 | 143 | 144 |
| Reactor 2 temperature (° C.) | 219 | 219 | 210 | 217 | 217 | 216 | 208 | 211 |
| Reactor 1 ethylene conversion (%) | 88.6 | 89.2 | 83.6 | 91.0 | 90.0 | 89.0 | | |
| Reactor 2 ethylene conversion (%) | | 75.6 | | | 80.1 | 80.2 | 89.8 | |
| Reactor 2 ethylene conversion (%) | 86.6 | 86.1 | 87.5 | 90.1 | 90.9 | | | |
| PIC-1 (ppm) | 0.14 | 0.13 | 0.09 | 0.15 | 0.13 | | 0.10 | 0.10 |
| PIC-1 (ppm) | 0 | 0 | 0 | 0 | 0 | | 0.22 | 0.38 |
| R2 (vii) (ppm) | 3.1 | 2.6 | 7.4 | 4.3 | 4.9 | | 0 | 0 |
| Polyethylene production rate (kg/h) | 75.8 | 78.0 | 83.5 | 92.7 | 94.6 | | 91.3 | 86.1 |

TABLE 2A

| Deconvolution Results for Disclosed Examples | | | |
|---|---|---|---|
| | Example (1) | | Example (2) | Example (3) |

| | | | Example (1) | | Example (2) | Example (3) |
|---|---|---|---|---|---|---|
| 1st ETHYLENE POLYMER (R1—Deconvolution Studies) | | Kinetic model (R1) | Deconv. Study (Flory Dist.) | | Kinetic model (R1) | Kinetic model (R1) |
| | | Single-Site | | | Single-Site | Single-Site |
| Weight fraction (%) | | 20% | 27% | | 21% | 27% |
| $M_n$ | | 161,500 | 125,000 | | 178,377 | 133,330 |
| $M_w$ | | 323,000 | 250,000 | | 356,754 | 266,660 |
| $M_z$ | | 484,500 | 375,000 | | 535,131 | 399,990 |
| Polydispersity Index ($M_w/M_n$) | | 2.0 | 2.0 | | 2.0 | 2.0 |
| Branch Freq/1000C (SCB1) | | 1.9 | | | 2.4 | 1.4 |
| Density estimate (g/cm$^3$) (eq. 1) | | 0.9218 | | | 0.9191 | 09261 |
| Melt Index $I_2$ estimate (g/10 min) (eq. 3) | | 0.0089 | | | 0.01 | 0.02 |
| 2nd ETHYLENE POLYMER (R2—Deconvolution Studies) | | Kinetic model (R2) | Deconv. Study (Flory Dist.) | | Kinetic model (R2) | Kinetic model (R2) |
| | | Ziegler-Natta | | | Ziegler-Natta | Ziegler-Natta |
| Weight fraction (%) | | 80% | 28% | | 79% | 73% |
| $M_n$ | | 19,200 | 10,000 | | 18,839 | 17,424 |
| $M_w$ | | 58,500 | 20,000 | | 51,676 | 42,794 |
| $M_z$ | | 123,600 | 30,000 | | 110,475 | 81,666 |
| Polydispersity Index ($M_w/M_n$) | | 3.0 | 2.0 | | 2.7 | 2.5 |
| Branch Freq/1000C (SCB2) | | 0.6 | | | 0.4 | 0.9 |
| Density estimate (g/cm$^3$) (eq. 1) | | 0.9618 | | | 0.9559 | 0.9594 |
| Melt Index $I_2$ estimate (g/10 min) (eq. 3) | | 8.0 | | | 12.6 | 25.6 |
| 3rd ETHYLENE POLYMER (Simulation—AFT + Trim) | | | Deconv. Study (Flory Dist.) | | | |
| Weight fraction (%) | | | 45% | | | |
| $M_n$ | | | 31,000 | | | |
| $M_w$ | | | 62,000 | | | |
| $M_z$ | | | 93,000 | | | |
| Polydispersity Index ($M_w/M_n$) | | | 2.0 | | | |
| Branch Freq/1000C (SCB2) | | | | | | |
| Density estimate (g/cm$^3$) | | | | | | |
| Melt Index $I_2$ estimate (g/10 min) | | | | | | |

TABLE 2B

| Deconvolution Results for Comparative Examples 1, 2, 3, 4, and 5 | | | | | |
|---|---|---|---|---|---|
| | Comp. Example 1 (U.S. Pat. No. 9,695,309 Ex 73) | Comp. Example 2 (U.S. Pat. No. 9,695,309 Ex 71) | Comp. Example 3 | Comp. Example 4 (Ex. #3 in U.S. Pat. No. 9,982,077) | Comp. Example 5 |
| 1st ETHYLENE POLYMER (R1—Deconvolution Studies) | Kinetic model (R1) | Kinetic model (RI) | Kinetic model (Ri) | Kinetic model (R1) | Kinetic model (Ri) |
| | Single-Site | Single-Site | Single-Site | Single-Site | Single-Site |
| Weight fraction (%) | 31% | 36% | 17% | 29% | 33% |
| $M_n$ | 88,100 | 84,900 | 166,500 | 111,200 | 83,500 |
| $M_w$ | 181,500 | 174,400 | 333,000 | 222,400 | 167,000 |
| $M_z$ | | | 499,400 | 333,600 | 250,500 |
| Polydispersity Index ($M_w/M_n$) | 2.1 | 2.1 | 2.0 | 2.0 | 2.0 |
| Branch Freq/lOOOC (SCB1) | 2.3 | 2.2 | 1.1 | 2.0 | 2.3 |
| Density estimate (g/cm$^3$) (eq. 2) | 0.9276 | 0.9283 | 0.9240 | 0.9264 | 0.9291 |
| Melt Index 12 estimate (g/10 min) (eq. 3) | 0.07 | 0.09 | 0.01 | 0.04 | 0.12 |
| 2nd ETHYLENE POLYMER (R2—Deconvolution Studies) | Kinetic model (R2) | Kinetic model (R2) | Kinetic model (R2) | Kinetic model (R2) | Kinetic model (R2) |
| | Ziegler-Natta | Ziegler-Natta | Ziegler-Natta | Single-Site | Single-Site |
| Weight fraction (%) | 61% | 57% | 73% | 71% | 67% |
| $M_n$ | 19,000 | 17,600 | 18,400 | 23,700 | 19,700 |
| $M_w$ | 52,500 | 45,000 | 48,800 | 47,400 | 39,400 |
| $M_z$ | 114,000 | 90,700 | 99,800 | 71,100 | 59,100 |
| Polydispersity Index ($M_w/M_n$) | 2.8 | 2.6 | 2.7 | 2.0 | 2.0 |
| Branch Freq/1000C (SCB2) | 0.7 | 0.9 | 0.4 | 0.0 | 0.0 |

TABLE 2B-continued

| Deconvolution Results for Comparative Examples 1, 2, 3, 4, and 5 | | | | | |
| --- | --- | --- | --- | --- | --- |
| | Comp. Example 1 (U.S. Pat. No. 9,695,309 Ex 73) | Comp. Example 2 (U.S. Pat. No. 9,695,309 Ex 71) | Comp. Example 3 | Comp. Example 4 (Ex. #3 in U.S. Pat. No. 9,982,077) | Comp. Example 5 |
| Density estimate (g/cm³) (eq. 2) | | | 0.9628 | 0.9568 | 0.9579 |
| Melt Index 12 estimate (g/10 min) (eq. 3) | 11.9 | 21,3 | 15.6 | 16.2 | 33.4 |
| 3rd ETHYLENE POLYMER (Simulation—AFT+Trim) | Kinetic model (R3) Ziegler-Natta | Kinetic model (R3) Ziegler-Natta | | | |
| Weight fraction (%) | 8% | 7% | | | |
| $M_n$ | 16,100 | 14,800 | | | |
| $M_w$ | 40,400 | 34,700 | | | |
| $M_z$ | | | | | |
| Polydispersity Index ($M_w/M_n$) | 2.5 | 2.3 | | | |
| Branch Freq/1000C (SCB2) | 0.0 | 0.0 | | | |
| Density estimate (g/cm³) | 0.9515 | 0.9522 | | | |

TABLE 3

| Resin Characteristics | | | | | | |
| --- | --- | --- | --- | --- | --- | --- |
| | Example (1) | Example (2) | Example (3) | Comp. Example 1 (U.S. Pat. No. 9,695,309 Ex 73) | Comp. Example 2 (U.S. Pat. No. 9,695,309 Ex 71) | Comp. Example 3 |
| Branch Freq/1000C (FTIR) | 0.9 | 3.4 | 1.1 | 2.0 | 2.0 | 0.6 |
| Comonomer ID | octene | octene | octene | octene | octene | octene |
| Comonomer mol % | 0.2 | 0.7 | 0.2 | 0.4 | 0.4 | 0.1 |
| Comonomer wt % | 0.7 | 2.7 | 0.8 | 1.6 | 1.6 | 0.5 |
| Unsat internal/100C (FTIR) | 0.001 | 0.001 | 0.001 | 0.001 | 0.001 | 0.001 |
| Side Chain Unsat/100C | 0.002 | 0.001 | 0.002 | 0.002 | 0.001 | 0.002 |
| Unsat terminal /100C (FTIR) | 0.061 | 0.064 | 0.047 | 0.047 | 0.048 | 0.06 |
| Unsat total /100C (FTIR) | 0.064 | 0.066 | 0.050 | 0.050 | 0.050 | |
| $M_n$ (GPC) | 22,983 | 24,268 | 19,684 | 26,026 | 26,051 | 24,828 |
| $M_w$ (GPC) | 105,018 | 109,673 | 106,535 | 100,009 | 94,966 | 96,786 |
| $M_z$ (GPC) | 314,217 | 384,584 | 335,419 | 274,043 | 265,760 | 301,876 |
| Polydispersity Index ($M_w/M_n$) | 4.6 | 4.5 | 5.4 | 3.8 | 3.6 | 3.9 |
| Index (Mz/Mw) | 3.0 | 3.5 | 3.1 | 2.7 | 2.8 | 3.1 |
| C-TREF CDBI (50) | 77.7 | 74.9 | 82.5 | 80.2 | 83.2 | |
| PSP2 (Buck et al. CPChem) based on GPC-FTIR Branching distribution profile | 6.4 | 7.8 | | 3.1 | 3.7 | |
| PSP2 (Buck et al. CPChem) based on Branching content (FTIR) | 5.7 | 5.6 | | 4.6 | 4.5 | |
| Dilution Index Yd | −2.60 | | −3.98 | −0.61 | −0.68 | |
| Dimensionless Modulus Xd = log(Gc/Gr) | −0.18 | | −0.19 | −0.11 | −0.16 | |

| | Comp. Example 4 (Ex. #3 in U.S. Pat. No. 9,982,077) | Comp. Example 5 | Comp. Example 6 | Comp. Example 7 | Comp. Example 8 |
| --- | --- | --- | --- | --- | --- |
| Branch Freq/1000C (FTIR) | 1.2 | 1.9 | 2.7 | 2.4 | 2.5 |
| Comonomer ID | octene | octene | octene | octene | hexene |
| Comonomer mol % | 0.2 | 0.4 | 0.5 | 0.5 | 0.5 |
| Comonomer wt % | 0.9 | 1.5 | 2.1 | 1.9 | 1.5 |
| Unsat internal/100C (FTIR) | 0.11 | 0.14 | 0.12 | | 0 |
| Side Chain Unsat/100C | 0 | 0 | 0 | | 0 |
| Unsat terminal /100C (FTIR) | 0.08 | 0.11 | 0.08 | | 0.02 |
| Unsat total /100C (FTIR) | 0.19 | 0.25 | 0.20 | | 0.02 |
| $M_n$ (GPC) | 35,000 | 27,000 | 28,500 | 10,375 | 10,189 |
| $M_w$ (GPC) | 102,000 | 86,000 | 89,500 | 94,834 | 105,947 |
| $M_z$ (GPC) | 264,000 | 221,500 | 250,000 | 283,975 | 499,610 |
| Polydispersity Index ($M_w/M_n$) | 2.9 | 3.2 | 3.1 | 9.1 | 10.4 |

TABLE 3-continued

| Resin Characteristics | | | | | |
|---|---|---|---|---|---|
| Index (Mz/Mw) | 2.6 | 2.6 | 2.8 | 3.0 | 4.7 |
| C-TREF CDBI (50) | 92.6 | 87.6 | 88.2 | 71.6 | |
| PSP2 (Buck et al. CPChem) based on GPC-FTIR Branching distribution profile | 2.8 | 4.8 | 5.7 | 8.2 | |
| PSP2 (Buck et al. CPChem) based on Branching content (FTIR) | 4.5 | 4.1 | 6.2 | 7.8 | |
| Dilution Index Yd | −4.76 | 0.02 | | | |
| Dimensionless Modulus Xd = log(Gc/Gr) | −0.27 | −0.11 | | | |

TABLE 4

| Results from GPC Measurements | | | | | | |
|---|---|---|---|---|---|---|
| | Example (1) | Example (2) | Example (3) | Comp. Example 1 (U.S. Pat. No. 9,695,309 Ex 73) | Comp. Example 2 (U.S. Pat. No. 9,695,309 Ex 71) | Comp. Example 3 |
| GPC-RI TEST RESULTS | | | | | | |
| Mn | 22,983 | 24,268 | 19,684 | 26,026 | 26,051 | 24,828 |
| Mw | 105,018 | 109,673 | 106,535 | 100,009 | 94,966 | 96,786 |
| Mz | 314,217 | 384,584 | 335,419 | 274,043 | 265,760 | 301,876 |
| Polydispersity Index (Mw/Mn) | 4.6 | 4.5 | 5.4 | 3.8 | 3.7 | 3.9 |
| Index (Mz/Mw) | 3.0 | 3.5 | 3.1 | 2.7 | 2.8 | 3.1 |
| Weight fraction with logMW ≤ 4 | 9.4% | 9.4% | 8.8% | 8.6% | 8.6% | 8.9% |
| Weight fraction with logMW ≥ 5 | 29.6% | 27.9% | 28.8% | 30.3% | 28.1% | 25.2% |

| | Comp. Example 4 (Ex. #3 in US 9,982,077) | Comp. Example 5 | Comp. Example 6 | Comp. Example 7 |
|---|---|---|---|---|
| GPC-RI TEST RESULTS | | | | |
| Mn | 35,108 | 26,927 | 28,464 | 10,375 |
| Mw | 102,082 | 86,123 | 89,339 | 94,834 |
| Mz | 264,139 | 221,664 | 250,256 | 283,975 |
| Polydispersity Index (Mw/Mn) | 2.9 | 3.2 | 3.1 | 9.1 |
| Index (Mz/Mw) | 2.6 | 2.6 | 2.8 | 3.0 |
| Weight fraction with logMW ≤ 4 | 4.1% | 6.8% | 5.9% | 25.2% |
| Weight fraction with logMW ≥ 5 | 28.6% | 25.1% | 25.1% | 32.2% |

TABLE 5

| | Example (1) | Example (2) | Example (3) | Comp. Example 1 (U.S. Pat. No. 9,695,309 Ex 73) | Comp. Example 2 (U.S. Pat. No. 9,695,309 Ex 71) | Comp. Example 3 |
|---|---|---|---|---|---|---|
| Flexural Properties | | | | | | |
| Flex Secant Mod. 1% (MPa) | 1271 | | | 1191 | 1154 | 1292 |
| Flex Sec Mod 1% (MPa) Dev. | 23 | | | 12 | 12 | 12 |
| Environmental Stress Crack Resistance | | | | | | |
| ESCR Cond. A10 (hrs) 10% CO-630 | 99-163 | | 104 | 83 | 103 | 49 |
| ESCR Cond. B10 (hrs) 10% CO-630 | 92 | 343 | 92 | 79 | 84 | 30 |
| ESCR Cond. A100 (hrs) 100% CO-630 | >1000 | >1000 | 568 | >1000 | >1000 | 163 |
| ESCR Cond. B100 (hrs) 100% CO-630 | 556 | >1000 | 860 | >1000 | >1000 | 97 |
| Impact Performance (test on plaque) | | | | | | |

TABLE 5-continued

| | | | | | |
|---|---|---|---|---|---|
| IZOD Impact (ft.lb/in) | 3.5 | 6.7 | 3.5 | | 1.9 |
| Tensile Impact (ft.lb/in²) | 187.1 | 146.2 | 205.4 | | 104 |
| Low Temperature ARM Impact Performance | | not tested | | | |
| Mean Failure Energy (ft.lb) at optimal conditions | 171.5-167.0 | | 107.3-70.7 | 138-176 | 158 |
| Ductility (%) at optimal conditions | 100-82 | | 90-91 | 90-70 | 100 |
| As is density (g/cm³) at optimal conditions | 0.950-0.954 | | 0.948-0.954 | 0.946-0.949 | 0.9463 |
| Oven time at oven temperature of 560° F. (min) | 24-26 | | 24-26 | | |

| | Comp. Example 4 (Ex. #3 in U.S. Pat. No. 9,982,077) | Comp. Example 5 | Comp. Example 6 | Comp. Example 7 | Comp. Example 8 |
|---|---|---|---|---|---|
| Flexural Properties | | | | | |
| Flex Secant Mod. 1% (MPa) | 1202 | 1057 | 1005 | | 1399 |
| Flex Sec Mod 1% (MPa) Dev. | 24 | 25 | 20 | | 33 |
| Environmental Stress Crack Resistance | | | | | |
| ESCR Cond. A10 (hrs) 10% CO-630 | | | | | 800 |
| ESCR Cond. B10 (hrs) 10% CO-630 | | | | 176 | 189 |
| ESCR Cond. A100 (hrs) 100% CO-630 | 120 | 80 | >1000 | | |
| ESCR Cond. B100 (hrs) 100% CO-630 | 112 | 141 | >1000 | | |
| Impact Performance (test on plaque) | | | | | |
| IZOD Impact (ft.lb/in) | | | 2.7 | 1.7 | 1.4 |
| Tensile Impact (ft.lb/in²) | | | 226.5 | 223.8 | 122.4 |
| Low Temperature ARM Impact Performance | | | | | |
| Mean Failure Energy (ft.lb) at optimal conditions | 185 | 185 | 188 | 72.0-36.5 | 0-0 |
| Ductility (%) at optimal conditions | 92 | 100 | 100 | 0-0 | 0-0 |
| As is density (g/cm³) at optimal conditions | 0.952 | 0.9488 | 0.9464 | 0.953-0.956 | 0.957-0.958 |
| Oven time at oven temperature of 560° F. (min) | | | | 22-24 | 24-26 |

INDUSTRIAL APPLICABILITY

Linear high-density polyethylene with high toughness and high Environmental Stress Crack Resistance.

The invention claimed is:

1. An interpolymer product comprising:

a first ethylene interpolymer comprising ethylene and an α-olefin having a weight-average molecular weight ($M_w$) of greater than 200,000 a density of less than 0.930 g/cm³, a short chain branching frequency of from 1.0 to 5.0 short chain branches per 1000 carbon atoms, and a polydispersity ($M_w/M_n$) of from 1.75 to 2.7;

and a second ethylene interpolymer comprising ethylene and an α-olefin wherein the second ethylene interpolymer comprises a $M_w$ of less than 70,000 a density of greater than 0.930 g/cm³, a short chain branching frequency of from 0.01 to 1.5 short chain branches per 1000 carbon atoms, and a polydispersity ($M_w/M_n$) of from 3.0 to 5.0; and wherein the interpolymer product comprises an environmental stress crack resistance (ESCR), measured according to ASTM D1693, Condition B, 10% IGEPAL CO-630, of greater than 90 hours and has a polydispersity ($M_w/M_n$) of from 3.0 to 5.4.

2. The interpolymer product of claim 1, wherein the density of the interpolymer product is from 0.94 g/cm³ to 0.97 g/cm³.

3. The interpolymer product of claim 1, wherein the ESCR of the interpolymer product is from 90 hours to 500 hours.

4. The interpolymer product of claim 1, wherein the IZOD impact strength of the interpolymer product is greater than 3.5 ft.lb/inch.

5. The interpolymer product of claim 1, wherein the interpolymer product has a tensile impact of greater than 140 ft.lb/in².

6. The interpolymer product of claim 1, wherein the interpolymer product has a melt index ($I_2$) of greater than 0.5 g/10 min.

7. The interpolymer product of claim 1, wherein the interpolymer product has a melt flow ratio, $I_{21}/I_2$, from 30 to 70.

8. The interpolymer product of claim 1, wherein the interpolymer product has a flex modulus (1% secant) of at least 1,000 MPa.

9. The interpolymer product of claim 1, wherein the interpolymer product has a total vinyl unsaturation of greater than 0.02 vinyl groups per 1,000 carbon atoms.

10. The interpolymer product of claim 1, wherein the interpolymer product has a long chain branching frequency of 0 long chain branches per 1,000 carbon atoms.

11. The interpolymer product of claim 1, wherein the interpolymer product has a short chain branching frequency from 0.5 to 5.0 short chain branches per 1000 carbon atoms.

12. The interpolymer product of claim 1, wherein the interpolymer product has, a $CDBI_{50}$ greater than 70%.

13. The interpolymer product of claim 1, wherein the α-olefin of the first ethylene interpolymer, the α-olefin of the second ethylene interpolymer, or the α-olefin of the first ethylene interpolymer and the second ethylene interpolymer comprises a $C_3$-$C_{12}$ α-olefin or a combination thereof.

14. The interpolymer product of claim 1, wherein the α-olefin of the first ethylene interpolymer, the α-olefin of the second ethylene interpolymer, or the α-olefin of the first ethylene interpolymer and the second ethylene interpolymer comprises 0.05 mol. % to 5 mol. % of the interpolymer product.

15. The interpolymer product of claim 1, wherein the interpolymer product has a number-average molecular weight $(M_n)$ from 12,000 to 45,000.

16. The interpolymer product of claim 1, wherein the interpolymer product has a z-average molecular weight $(M_z)$ from 280,000 to 500,000.

17. The interpolymer product of claim 1, wherein the interpolymer product has a polydispersity $(M_w/M_n)$ from 3 to 5.

18. The interpolymer product of claim 1, wherein the interpolymer product has a Dilution Index, Yd, less than 0.

19. The interpolymer product of claim 1, wherein the interpolymer product has a primary structure parameter (PSP2) from 2 to 8.9 as determined by the GPC-FTIR Branching distribution profile.

20. The interpolymer product of claim 1, comprising, based on total weight percent of the interpolymer product:
10-45 wt. % of the first interpolymer; and
55-90 wt. % of the second interpolymer.

21. The interpolymer product of claim 1, comprising, based on total weight percent of the interpolymer product:
10-40 wt. % of the first interpolymer; and
60-90 wt. % of the second interpolymer.

22. The interpolymer product of claim 1, wherein the first interpolymer has a $M_w$ of from 200,000 to 500,000.

23. The interpolymer product of claim 1, wherein the first interpolymer has a $M_n$ from 100,000 to 200,000.

24. The interpolymer product of claim 1, wherein the first interpolymer has a $M_z$ from 320,000 to 650,000.

25. The interpolymer product of claim 1, wherein the first interpolymer has a short chain branching frequency from 1.0 to 5.0 short chain branches per 1,000 carbon atoms.

26. The interpolymer product of claim 1, wherein the first interpolymer has a melt index $(I_2)$ of up to 0.4 g/10 min.

27. The interpolymer product of claim 1, wherein the first interpolymer has a density from 0.90 g/cm³ to 0.93 g/cm³.

28. The interpolymer product of claim 1, wherein the second interpolymer has a $M_w$ from 30,000 to 70,000.

29. The interpolymer product of claim 1, wherein the second interpolymer has a $M_n$ from 10,000 to 30,000.

30. The interpolymer product of claim 1, wherein the second interpolymer has a $M_z$ from 70,000 to 125,000.

31. The interpolymer product of claim 1, wherein the second interpolymer has a short chain branching frequency from 0.01 to 1.5 short chain branches per 1,000 carbon atoms.

32. The interpolymer product of claim 1, wherein the second interpolymer has a melt index from 1 g/10 min to 500 g/10 min.

33. The interpolymer product of claim 1, wherein the second interpolymer has a density from 0.93 to 0.98.

34. An interpolymer product comprising:
a first ethylene interpolymer comprising ethylene and an α-olefin having a weight-average molecular weight $(M_w)$ from 300,000-450,000 and a density from 0.900 g/cm³ to 0.930 g/cm³; and
a second ethylene interpolymer comprising ethylene and an α-olefin wherein the second ethylene interpolymer has a $M_w$ less than 200,000 a density from 0.930 g/cm³ to 0.980 g/cm³, and a polydispersity $(M_w/M_n$ of from 3.0 to 5.0; and
wherein the interpolymer product has:
an environmental stress crack resistance (ESCR), measured according to ASTM D1693, Condition B, 10% IGEPAL CO-630, from greater than 90 hours;
an IZOD impact strength from 5 ft.lb/inch to 8.0 ft.lb/inch;
a density from 0.945 g/cm³ to 0.960 g/cm³;
a melt index $(I_2)$ from 0.9 g/10 min to 3.0 g/10 min; and
a melt flow ratio, $I_{21}/I_2$, from 35 to 65.

35. A rotomolded article comprising a wall structure including at least one layer comprising an ethylene interpolymer product comprising:
a first ethylene interpolymer comprising ethylene and an α-olefin having a weight-average molecular weight $(M_w)$ of greater than 200,000 a density of less than 0.930 g/cm³, a short chain branching frequency of from 1.0 to 5.0 short chain branches per 1000 carbon atoms, and a polydispersity $(M_w/M_n)$ of from 1.75 to 2.7; and
a second ethylene interpolymer comprising ethylene and an α-olefin wherein the second ethylene interpolymer has a $M_w$ of less than 70,000 a density of greater than 0.930 g/cm³, a short chain branching frequency of from 0.01 to 1.5 short chain branches per 1000 carbon atoms, and a polydispersity $(M_w/M_n)$ of from 2.5 to 5.4; and
wherein the interpolymer product has an environmental stress crack resistance (ESCR), measured according to ASTM D1693, Condition B, 10% IGEPAL CO-630, of greater than 90 hours.

* * * * *